US009164192B2

(12) United States Patent
Maerten et al.

(10) Patent No.: US 9,164,192 B2
(45) Date of Patent: Oct. 20, 2015

(54) STRESS AND FRACTURE MODELING USING THE PRINCIPLE OF SUPERPOSITION

(75) Inventors: Frantz Maerten, Pignan (FR); Laurent Maerten, Clapiers (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 953 days.

(21) Appl. No.: 13/052,327

(22) Filed: Mar. 21, 2011

(65) Prior Publication Data

US 2012/0072188 A1 Mar. 22, 2012

Related U.S. Application Data

(60) Provisional application No. 61/317,412, filed on Mar. 25, 2010.

(51) Int. Cl.
*G06F 7/60* (2006.01)
*G06G 7/48* (2006.01)
*G01V 99/00* (2009.01)

(52) U.S. Cl.
CPC ...... *G01V 99/005* (2013.01); *G01V 2210/6242* (2013.01); *G01V 2210/64* (2013.01); *G01V 2210/642* (2013.01); *G01V 2210/646* (2013.01)

(58) Field of Classification Search
None
See application file for complete search history.

(56) References Cited

U.S. PATENT DOCUMENTS

| 4,745,562 | A | 5/1988 | Prazdny |
|---|---|---|---|
| 5,214,613 | A | 5/1993 | Esmersoy |
| 5,808,963 | A | 9/1998 | Esmersoy |
| 6,573,722 | B2 | 6/2003 | Rosthal et al. |
| 6,624,634 | B2 | 9/2003 | Rosthal et al. |
| 6,680,613 | B2 | 1/2004 | Rosthal et al. |
| 6,710,601 | B2 | 3/2004 | Rosthal et al. |
| 7,677,306 | B2 | 3/2010 | Lecampion et al. |
| 8,339,897 | B2 | 12/2012 | Aeron et al. |
| 2003/0146751 | A1 | 8/2003 | Rosthal et al. |
| 2003/0146753 | A1 | 8/2003 | Rosthal et al. |
| 2003/0155924 | A1 | 8/2003 | Rosthal et al. |

(Continued)

OTHER PUBLICATIONS

"Integration of Fracture Data into 3D Geomechanical Modeling to Enhance Fractured Reservoirs Characterization", Mace, et al. Copyright 2005, Society of Petroleum Engineers.*

(Continued)

*Primary Examiner* — Omar Fernandez Rivas
*Assistant Examiner* — Nithya J Moll
(74) *Attorney, Agent, or Firm* — Colin L. Wier; Rodney Warfford

(57) ABSTRACT

Stress and fracture modeling using the principal of superposition is provided. A system simulates linearly independent far field stress models for a subsurface earth volume, computing stress, strain, and displacement values based on superposition of independent stress tensors. Based on the precomputed values, the system generates real-time recovery of paleostress values, or, stress, strain, and displacement parameters for any point in the subsurface volume as the user varies far field stress values. The system recovers one or more tectonic events, or a stress tensor represented by a ratio of principal magnitudes and associated orientation, using fault geometry, well bore data (fracture orientation and secondary fault plane data), GPS, InSAR, folded and faulted horizons, tiltmeters, slip and slikenlines on faults. The system uses different geologic data from seismic interpretation, well bore readings, and field observation to provide numerous results, such as predicted fracture propagation based on perturbed stress field.

12 Claims, 13 Drawing Sheets

(56) References Cited

U.S. PATENT DOCUMENTS

| | | | |
|---|---|---|---|
| 2005/0125209 A1* | 6/2005 | Soliman et al. | 703/10 |
| 2008/0071505 A1* | 3/2008 | Huang et al. | 703/2 |
| 2008/0319675 A1* | 12/2008 | Sayers | 702/11 |
| 2009/0240478 A1* | 9/2009 | Searles et al. | 703/2 |
| 2010/0004906 A1* | 1/2010 | Searles et al. | 703/2 |
| 2011/0172981 A1* | 7/2011 | Al-Hashimi et al. | 703/11 |

OTHER PUBLICATIONS

Maerten, Franz, "Geomechanics to solve geological structure issues: forward, inverse and restoration modeling", PhD Thesis: University of Montpeliler II, France, 2010, 456 pages.*

E. M. Anderson, The dynamics of faulting, Edinburgh Geol. Soc., vol. 8(3), 1905, pp. 387-402.

J. Angelier, Tectonic analysis of fault slip data sets, J. Geophys. Res., vol. 89, 1984, pp. 5835-5848.

J. Angelier, et al., Inversion of field data in fault tectonics to obtain the regional stress—i. single phace fault populations: a new method of computing the stress tensor, J. Geophys. Res., vol. 69, 1982, pp. 607-621.

E. Carey, et al., Analyse the orque et. Numerique d'un modele mecanique elementaire applique a Petude d'une population de failles. C.r. Acad, Sci., Paris, vol. 279, 1974, pp. 891-894.

M. Comninou, et al., The angular dislocation in a half space, Journal of Elasticity, vol. 5(3), 1975, pp. 203-216.

A. Etchecopar, et al., An inverse problem in micro tectonics for the determination of stress tensors from fault striation analysis, J. Struct. Geo., vol. 3(1), 1981, pp. 51-65.

N. Fry, Striated faults: visual appreciation of their constraint on possible paleostress tensors, J. Struct. Geo., vol. 21 (1), 1999, pp. 7-21.

J. W. Gephart, et al., An Improved Method for Determining the Regional Stress Tensor Using Earthquake Focal Mechanism Data: Application to the San Fernando Earthquake Sequence, Journal of Geophysical Research, vol. 89, No. B11, pp. 9305-9320, 1984.

J.M. Hammersley, et al., Monte Carlo Methods, Fletcher, Norich, England, 1975.

O. Kaven, Geometry and mechanics of three-dimensional faults: implications for slip, afterschocks, and paleostress, PhD thesis, Stanford University, CA, USA, 2009.

F. Maerten, Adaptive cross approximation applied to the solution of system of equations and post-processing for 3d elastostatic problems using the boundary element method, Engineering Analysis with Boundary Elements, vol. 34, 2010, pp. 483-491.

F. Maerten, et al., Iterative 3d bem solver on complex faults geometry using angular dislocation approach in heterogeneous, isotropic elastic whole or half-space, In Brebbia, editor, Boundary Elements and other Mesh Reduction Methods XX, Southampton, 2008, BEM 30, WITpress, pp. 201-208.

F. Maerten, et al., Solving 3d boundary element problems using constrained iterative approach, Computational Geosciences, 2009.

F. Maerten, et al., Inverting for slip on three-dimensional fault surfaces using ancular dislocations, Bulletin of the Seismological Society of America, vol. 95, 2005, pp. 1654-1665.

L. Maerten, Variation in slip on intersectiong normal faults: Implications for palcostress inversion, Journal of Geophysical Research, vol. 105(25), 2000, pp. 553-565.

L. Maerten, et al., Effect of local stress perturbation of secondary fault development, Journal of Structural Geology, vol. 24, 2002, pp. 145-153.

L. Maerten, et al., Slip distributions on intersecting normal faults, Journal of Structural Geology, vol. 12, 1999, pp. 259-271.

G. Mandl, Mechanics of tectonic faulting. Models and basic concepts, Elsevier, Amsterdam, 1988.

M. D. McKay, et al., A comparison of three methods for selecting values of input variables in analysis of output from a computer code, Technometrics, vol. 21, 1979, pp. 239-245.

A. Michael, Use of focal mechanisms to determine stress: a control study, J. Geophys. Res., vol. 92(B1), 1987, pp. 357-368.

J. R. Muller, et al., Invsetigating the transition between the 1967 mudurnu valley and 1999 izmit earthquakes along the norh anatolian fault with static stress changes, Geophysics Journal International, vol. 154, 2003, pp. 471-482.

Y. Okada, Surface deformation due to shear and tensile faults in a half-space, Bulletin of the Seismological Society of America, vol. 75, 1985, pp. 1135-1154.

N. J. Price, Fault and Jount Development in Brittle and Semi-brittle Rock, Pergamon, London, 1966.

Z. Reches, Determination of the tectonic stress tensor from slip along faults that obey the coulomb yield condition, Tectonics, vol. 6(4), 1987, pp. 849-861.

R. Y. Rubinstein, Simulation and the Monte Carlo Method, John Wiley and Sons. Inc., 1981.

Y. Shan, et al., A stress inversion procedure for automated recognition of polyphase fault/slip data sets, J. Struct. Geol., vol. 26(9), 2004, pp. 919-925.

A. L. Thomas, Poly3d: a three-dimentional, polygonal element, displacement discontinuity boundary element computer program with applications to fractures, faults, and cavities in the earth's crust. Master's thesis, Stanford University, 1993.

B. Voight, Beziehung zwichen groBen horizontalen spannungen in gebirge und der tektonik und der abtragung, In Rock Mech., 1st Congr., vol. 2, Lisbon. Int. Soc., 1966, pp. 1-56.

Maerten, Frantz, "Geomechanics to solve geological structure issues: forward, inverse and restoration modeling", PhD Thesis: University of Montpellier II, France, 2010, 456 pages.

* cited by examiner

STRESS AND FRACTURE MODELING USING THE PRINCIPLE OF SUPERPOSITION

RELATED APPLICATIONS

This patent application claims the benefit of priority to U.S. Provisional Patent Application No. 61/317,412 to Maerten et al., filed Mar. 25, 2010, which is incorporated herein by reference.

BACKGROUND

A fault may be considered a finite complex three-dimensional surface discontinuity in a volume of earth or rock. Fractures, such as joints, veins, dikes, pressure solution seams with stylolites, and so forth, may be propagated intentionally, to increase permeability in formations such as shale, in which optimizing the number, placement, and size of fractures in the formation increases the yield of resources like shale gas.

Stress, in continuum mechanics, may be considered a measure of the internal forces acting within a volume. Such stress may be defined as a measure of the average force per unit area at a surface within the volume on which internal forces act. The internal forces are typically produced between the particles in the volume as a reaction to external forces applied on the volume.

Understanding the origin and evolution of faults and the tectonic history of faulted regions can be accomplished by relating fault orientation, slip direction, geologic and geodetic data to the state of stress in the earth's crust. In conventional inverse problems, the directions of the remote principal stresses and a ratio of their magnitudes are constrained by analyzing field data on fault orientations and slip directions as inferred from artifacts such as striations on exposed fault surfaces.

Conventional methods for stress inversion, using measured striations and/or throw on faults, are mainly based on the assumptions that the stress field is uniform within the rock mass embedding the faults (assuming no perturbed stress field), and that the slip on faults has the same direction and sense as the resolved far field stress on the fault plane. However, it has been shown that slip directions are affected by: anisotropy in fault compliance caused by irregular tip-line geometry; anisotropy in fault friction (surface corrugations); heterogeneity in host rock stiffness; and perturbation of the local stress field mainly due to mechanical interactions of adjacent faults. Mechanical interactions due to complex faults geometry in heterogeneous media should be taken into account while doing the stress inversion. By doing so, determining the parameters of such paleostress in the presence of multiple interacting faults requires running numerous simulations, and therefore an enormous amount of computation time in order to fit the observed data. The conventional parameters space has to be scanned for all possibilities, and for each simulation the model and the post-processes need to be recomputed.

Motion equations are typically not invoked while using conventional methods, and perturbations of the local stress field by fault slip are ignored. The mechanical role played by the faults in tectonic deformation is not explicitly included in such analyses. Still, a relatively full mechanical treatment is applied for conventional paleostress inversion. However, the results might be greatly improved if multiple types of data could be used to better constrain the inversion.

SUMMARY

Stress and fracture modeling using the principal of superposition is provided. An example system simulates linearly independent far field stress models for a subsurface earth volume, computing stress, strain, and/or displacement values based on superposition of independent stress tensors. Based on the precomputed values, the system can generate real-time results, such as recovery of paleostress values, or, stress, strain, and displacement parameters for any point in the subsurface volume as the user varies the far field stress value. The system may recover one or more tectonic events, or a stress tensor represented by a ratio of principal magnitudes and associated orientation, using only fault geometry, well bore data (including fracture orientation and secondary fault plane data), GPS, InSAR, folded and faulted horizons, tiltmeters, slip and slikenlines on faults. The system can use different types of geologic data from seismic interpretation, well bore readings, and field observation to provide numerous results, such as predicted fracture propagation based on perturbed stress field.

This summary section is not intended to give a full description of stress and fracture modeling using the principle of superposition, or to provide a comprehensive list of features and elements. A detailed description with example implementations follows.

DETAILED DESCRIPTION

Overview

This disclosure describes stress and fracture modeling using the principle of superposition. Given diverse input data, such as faults geometry, and selectable or optional data sets or data measures, including fault throw, dip-slip or slickenline directions, stress measurements, fracture data, secondary fault plane orientations, global positioning system (GPS) data, interferometric synthetic aperture radar (InSAR) data, geodetic data from surface tilt-meters, laser ranging, etc., the example system can quickly generate or recover numerous types of results. The systems and methods described herein apply the principle of superposition to fault surfaces with complex geometry in 3D (not only planar), and the faults are, by nature, of finite dimension and not infinite or semi-infinite. The results are often rendered in real-time and may include, for example, real-time stress, strain, and/or displacement parameters in response to a user query or an updated parameter; remote stress states for multiple tectonic events; prediction of intended future fracturing; differentiation of preexisting fractures from induced fractures; and so forth. The diverse input data can be derived from well bore data, seismic interpretation, field observation, etc.

The example systems and methods described below are applicable to many different reservoir and subsurface operations, including exploration and production operations for natural gas and other hydrocarbons, storage of natural gas, hydraulic fracturing and matrix stimulation to increase reservoir production, water resource management including development and environmental protection of aquifers and other water resources, capture and underground storage of carbon dioxide ($CO_2$), and so forth.

In an example implementation, a system applies a 3-dimensional (3D) boundary element technique using the principle of superposition that applies to linear elasticity for heterogeneous, isotropic whole- or half-space media. Based on precomputed values, the example system can assess a cost function to generate real-time results, such as stress, strain, and displacement parameters for any point in a subsurface volume as the user varies the far field stress value. In one implementation, the system uses only fault geometry and well bore data, including, e.g., fracture orientation, secondary fault plane data, and/or in-situ stress measurement by hydraulic fracture, to recover one or more tectonic events or a stress tensor represented by a ratio of principal magnitudes and the associated orientation. The system can use many different types of geologic data from seismic interpretation, well bore readings, and field observation to provide a variety of results, such as predicted fracture propagation based on perturbed stress field.

Figure 1:
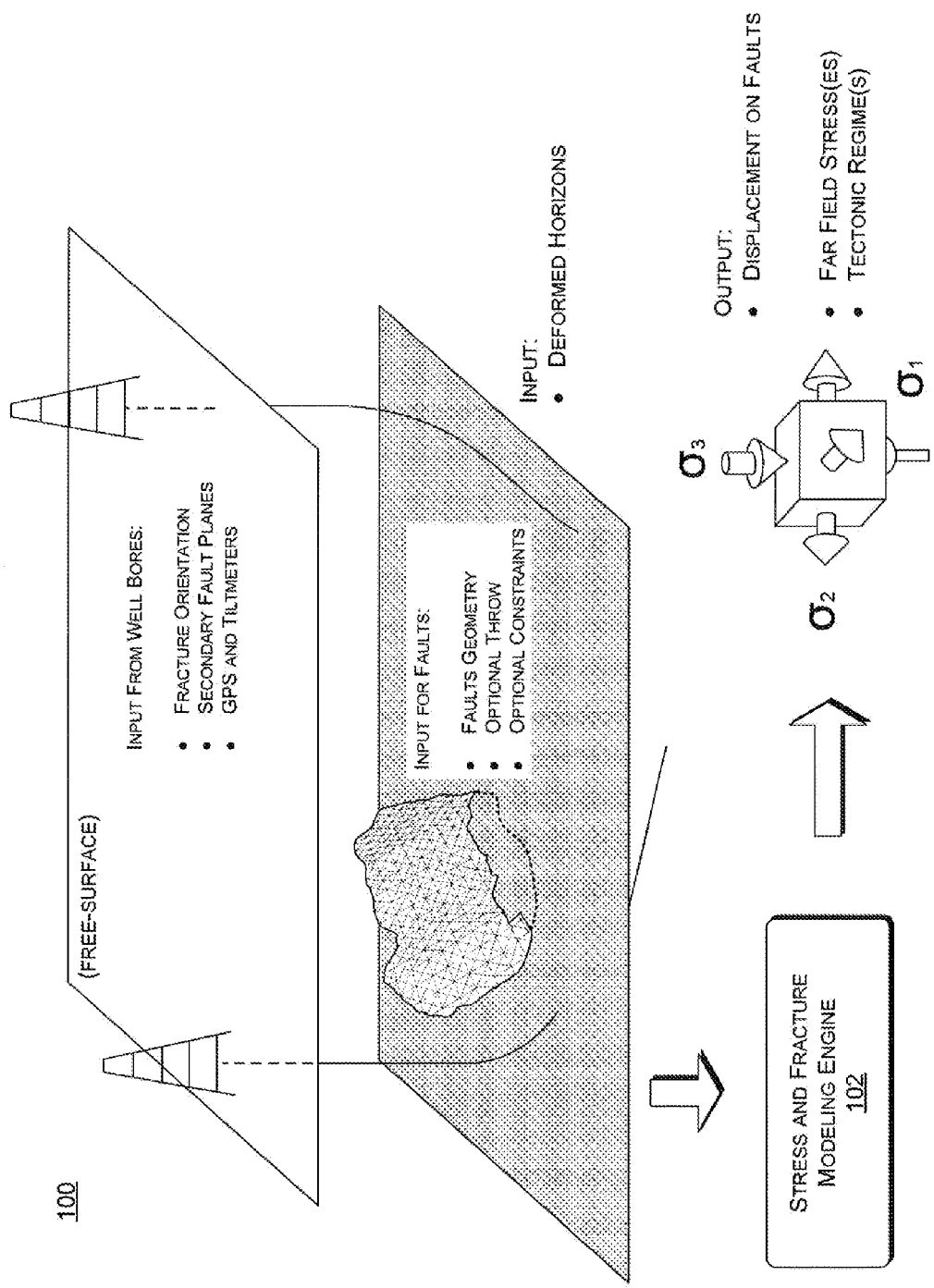
FIG. 1 is a diagram of an example stress and fracture modeling system.

FIG. 1 shows an example stress and fracture modeling system 100. The example system 100 can solve both common and unusual geomechanical problems. The faults geometry is often known (and optionally, measured fault throw and imposed inequality constraints such as normal, thrust, etc., may be knowns). The user may typically have access to data from well bores (fracture orientation, in-situ stress measurements, secondary fault planes), geodetic data (InSAR, GPS, and tilt-meter), as well as interpreted horizons. An example stress and fracture modeling engine 102 and/or corresponding example methods can recover the remote stress state and tectonic regime for relevant tectonic event(s), as well as displacement discontinuity on faults, and estimate the displacement and perturbed strain and stress fields anywhere within the system, for example.

Using the principle of superposition, the example stress and fracture modeling system 100 or engine 102 may perform each of three linearly independent simulations of stress tensor models in constant time regardless of the complexity of each underlying model. Each model does not have to be recomputed. Then, as introduced above, applications for the example system 100 may include stress interpolation and fracture modeling, recovery of tectonic event(s), quality control on interpreted faults, real-time computation of perturbed stress and displacement fields when the user is performing parameters estimation, prediction of fracture propagation, distinguishing preexisting fractures from induced fractures, and numerous other applications.

Example Environment

Figure 2:
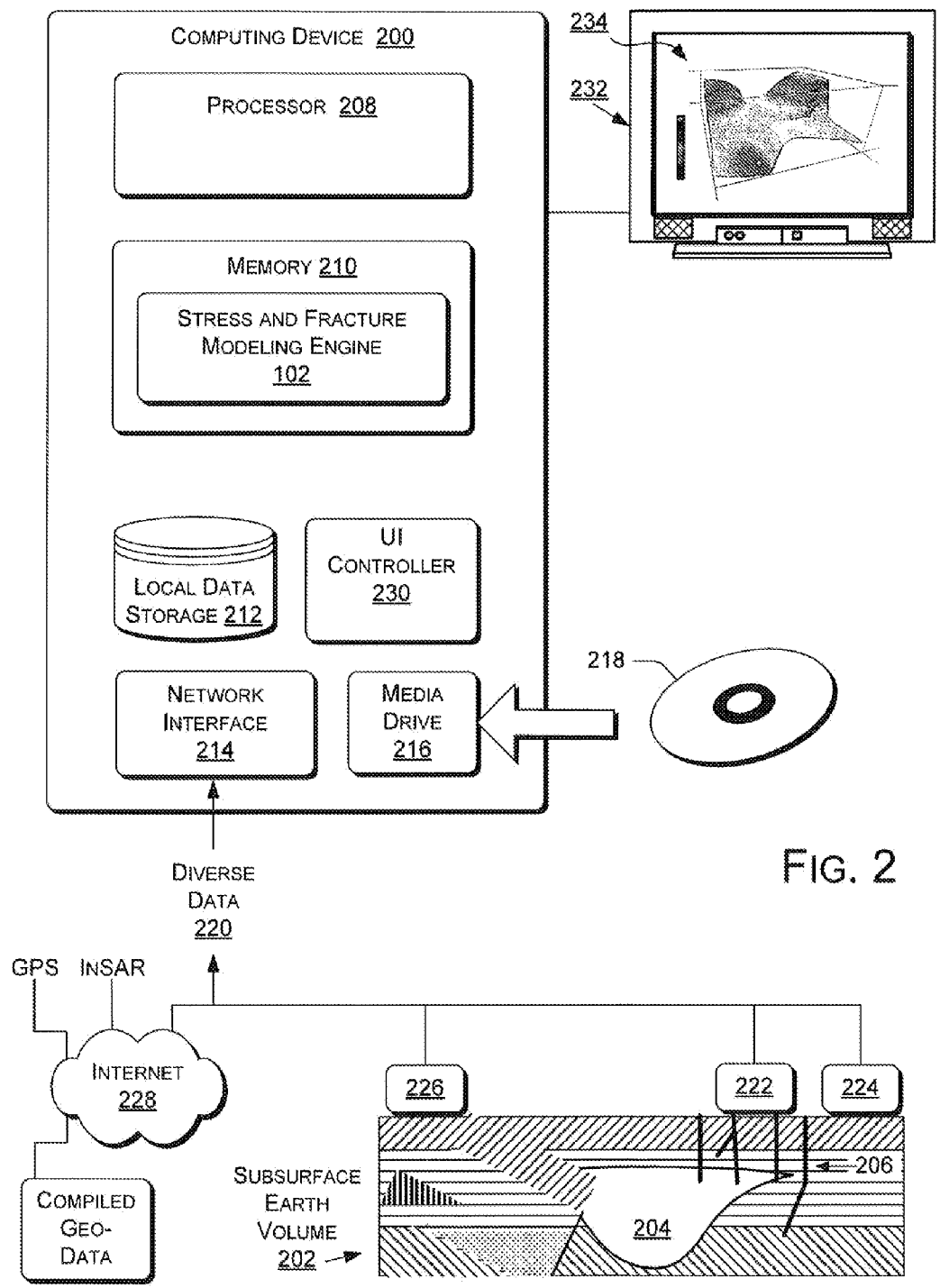
FIG. 2 is a block diagram of an example computing environment for performing stress and fracture modeling using the principle of superposition.

FIG. 2 shows the example system 100 of FIG. 1 in the context of a computing environment, in which stress and fracture modeling using the principle of superposition can be performed.

In the shown implementation, a computing device 200 implements a component, such as the example stress and fracture modeling engine 102. The example stress and fracture modeling engine 102 is illustrated as software, but can be implemented as hardware or as a combination of hardware and software instructions.

In the illustrated example, the computing device 200 is communicatively coupled via sensory devices (and control devices) with a real-world setting, for example, an actual subsurface earth volume 202, reservoir 204, depositional basin, seabed, etc., and associated wells 206 for producing a petroleum resource, for water resource management, or for carbon services, and so forth.

The computing device 200 may be a computer, computer network, or other device that has a processor 208, memory 210, data storage 212, and other associated hardware such as a network interface 214 and a media drive 216 for reading and writing a removable storage medium 218. The removable storage medium 218 may be, for example, a compact disk (CD); digital versatile disk/digital video disk (DVD); flash drive, etc. The removable storage medium 218 contains instructions, which when executed by the computing device 200, cause the computing device 200 to perform one or more example methods described herein. Thus, the removable storage medium 218 may include instructions for implementing and executing the example stress and fracture modeling engine 102. At least some parts of the example stress and fracture modeling engine 102 can be stored as instructions on a given instance of the removable storage medium 218, removable device, or in local data storage 212, to be loaded into memory 210 for execution by the processor 208.

Although the illustrated example stress and fracture modeling engine 102 is depicted as a program residing in memory 210, a stress and fracture modeling engine 102 may be implemented as hardware, such as an application specific integrated circuit (ASIC) or as a combination of hardware and software.

In this example system, the computing device 200 receives incoming data 220, such as faults geometry and many other kinds of data, from multiple sources, such as well bore measurements 222, field observation 224, and seismic interpretation 226. The computing device 200 can receive many types of data sets 220 via the network interface 214, which may also receive data from the Internet 228, such as GPS data and InSAR data.

The computing device 200 may compute and compile modeling results, simulator results, and control results, and a display controller 230 may output geological model images and simulation images and data to a display 232. The images may be 2D or 3D simulation 234 of stress and fracture results using the principle of superposition. The example stress and fracture modeling engine 102 may also generate one or more visual user interfaces (UIs) for input and display of data.

The example stress and fracture modeling engine 102 may also generate or ultimately produce control signals to be used via control devices, e.g., such as drilling and exploration equipment, or well control injectors and valves, in real-world control of the reservoir 204, transport and delivery network, surface facility, and so forth.

Thus, an example system 100 may include a computing device 200 and interactive graphics display unit 232. The computing system as a whole may constitute simulators, models, and the example stress and fracture modeling engine 102.

Example Engine

Figure 3:
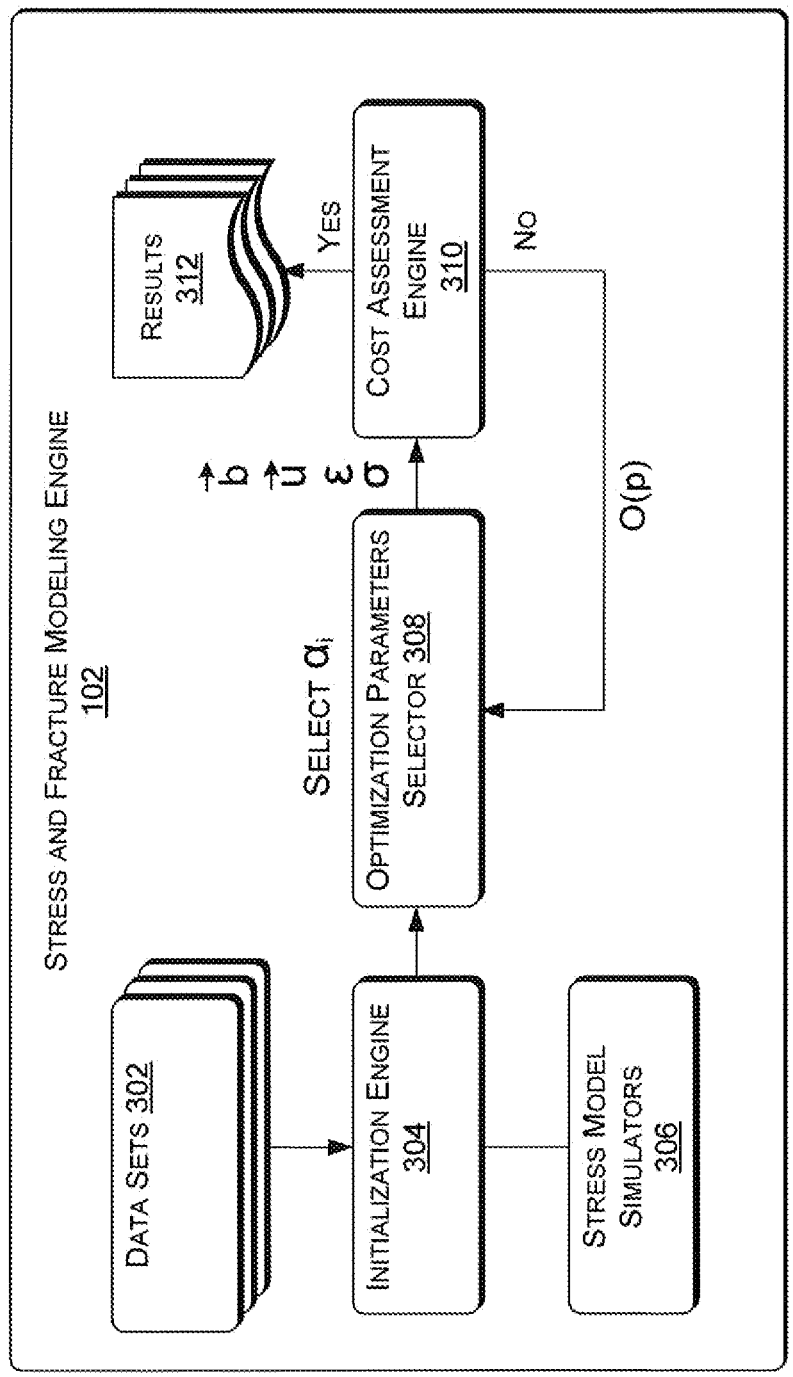
FIG. 3 is a block diagram of an example stress and fracture modeling engine.

FIG. 3 shows the example stress and fracture modeling engine 102 in greater detail than in FIG. 1 and FIG. 2. The illustrated implementation is only one example configuration for the sake of description, to introduce features and components of an engine that performs the example stress and fracture modeling using the principle of superposition. The illustrated components are only examples. Different configurations or combinations of components than those shown may be used to perform the stress and fracture modeling functions, and different or additional components may also be used. As introduced above, the example stress and fracture modeling engine 102 can be implemented in hardware, or in combinations of hardware and software. Illustrated components are communicatively coupled with each other for communication as needed. Arrows are shown only to suggest process flow or data flow, since the components can communicate with each other as needed.

The example stress and fracture modeling engine 102 illustrated in FIG. 3 includes a buffer for data sets 302 or at least access to the data sets 302, an initialization engine 304, stress model simulators 306 or at least an access to the stress model simulators 306, a optimization parameters selector 308, a cost assessment engine 310, and a buffer or output for results 312. These components are shown for descriptive purposes. Other components, or other arrangement of the components, can enable various implementations of the example stress and fracture modeling engine 102. The functionality of the example stress and fracture modeling engine 102 will be described next.

Operation of the Example System and Engine

Figure 4:
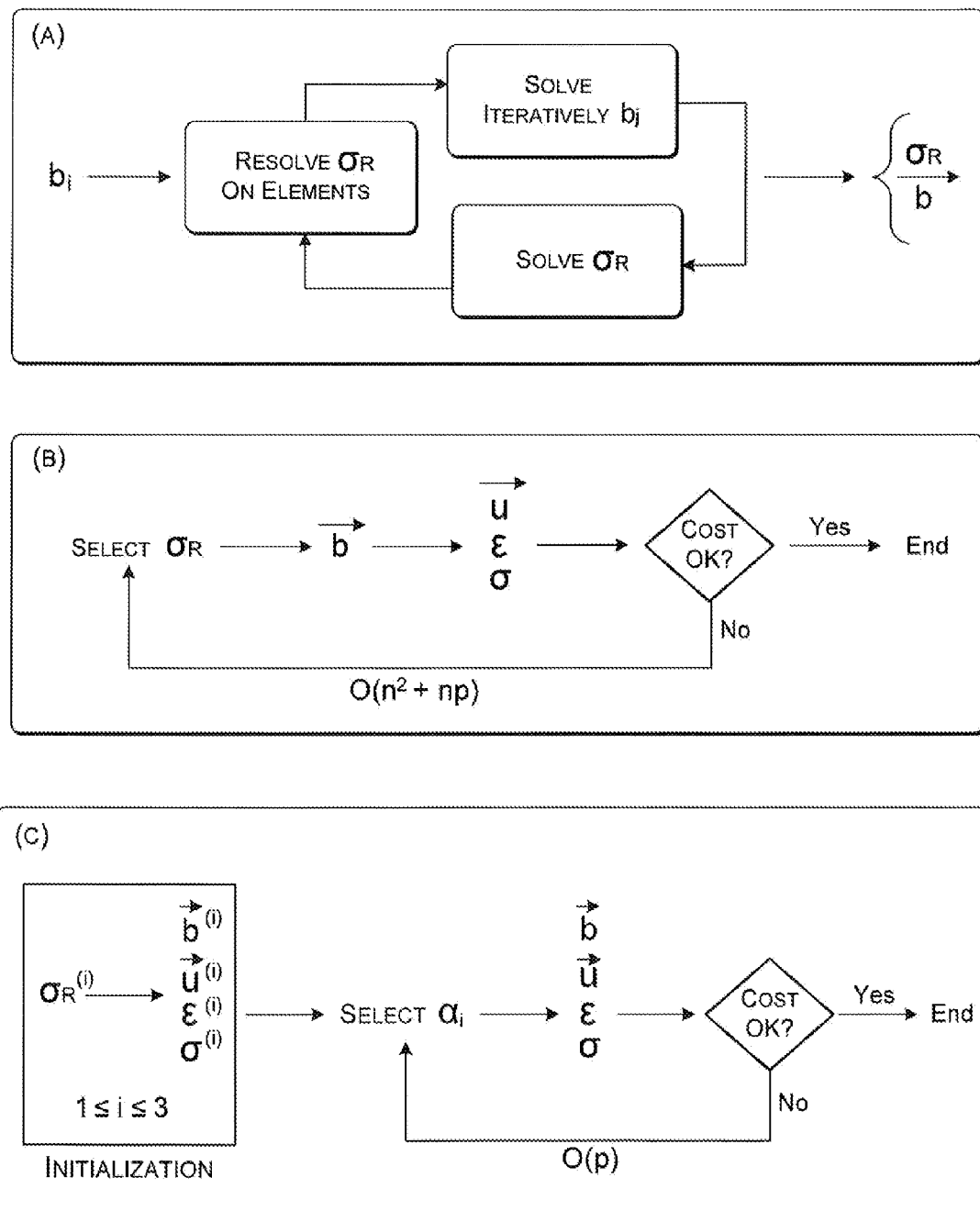
FIG. 4 is a block diagram comparing techniques for recovering paleostress.

FIG. 4 shows various methods for recovering paleostress. FIG. 4(a) shows a conventional technique that uses only slip distributions on faults as data input, but provides unstable results. The technique of FIG. 4(a) cannot augment the slip distributions with alternative forms of data input, such as GPS data, and so forth. FIG. 4(b) depicts a conventional (2D) Monte Carlo method, but without the optimization using the principle of superposition. FIG. 4(c) shows an example method as described herein, including techniques that utilize the principle of superposition and drastically reduce the complexity of the model. The example method shown in FIG. 4(c) may be implemented by the example stress and fracture modeling engine 102. For example, in one implementation the initialization engine 304, through the stress model simulators 306, generates three precomputed models of the far field stress associated with a subsurface volume 202. For each of the three models, the initialization engine 304 precomputes, for example, displacement, strain, and/or stress values. The optimization parameters selector 308 iteratively scales the displacement, strain, and/or stress values for each superpositioned model to minimize a cost at the cost assessment engine 310. The values thus optimized in real-time are used to generate particular results 312.

In one implementation, the three linearly independent far field stress parameters are: (i) orientation toward the North, and (ii) & (iii) the two principal magnitudes. These far field stress parameters are modeled and simulated to generate a set of the variables for each of the three simulated models. Four variables can be used: displacement on a fault, the displacement field at any data point or observation point, a strain tensor at each observation point, and the tectonic stress. The optimization parameters selector 308 selects an alpha for each simulation, i.e., a set of "alphas" for the three simulated stress models to act as changeable optimization parameters for iteratively converging on values for these variables in order to minimize one or more cost functions, to be described below. In one implementation, the optimization parameters selector 308 selects optimization parameters at random to begin converging the scaled strain, stress, and or displacement parameters to lowest cost. When the scaled (substantially optimized) parameters are assessed to have the lowest cost, the scaled strain, stress, and/or displacement parameters can be applied to predict a result, such as a new tectonic stress.

Because the example method of FIG. 4(c) uses precomputed values superpositioned from their respective simulations, the example method or the stress and fracture modeling engine 102 can provide results quickly, even in real-time. As introduced above, the stress and fracture modeling engine 102 can quickly recover multiple tectonic events responsible for present conditions of the subsurface volume 202, or more quickly discern induced fracturing from preexisting fracturing than conventional techniques, or provide real-time parameter estimation as the user varies a stress parameter, or can rapidly predict fracturing, and so forth.

While conventional paleostress inversion may apply a full mechanical scenario, the stress and fracture modeling engine 102 improves upon conventional techniques by using multiple types of data. Data sets 302 to be used are generally of two types: those which provide only orientation information (such as fractures, secondary fault planes with internal friction angle, and fault striations, etc.), and those which provide magnitude information (such as fault slip, GPS data, InSAR data, etc.). Conventionally, paleostress inversion has been computed using slip measurements on fault planes.

The conventional technique shown in FIG. 4(a) executes an operation that proceeds in two stages: (i) resolving the initial remote stress tensor $\sigma_R$ onto the fault elements that have no relative displacement data and solving for the unknown relative displacements ($b_j$ in FIG. 4(a)); and, (ii) using the computed and known relative displacements to solve for $\sigma_R$ (FIG. 4(a)). An iterative solver is conventionally used, that cycles between stages (i) and (ii) until convergence.

The conventional technique shown in FIG. 4(b) is based on a Monte-Carlo algorithm. However, this conventional technique proves to be unfeasible since it requires a long computation time, for which the complexity is $O(n^2+p)$, where n and p are a number of triangular elements modeling the faults and the number of data points, respectively. For a given simulation, a random far field stress $\sigma_R$ is chosen, and the corresponding displacement discontinuity $\vec{b}$ on faults is computed. Then, as a post-process at data points, and depending on the type of measurements, cost functions are computed using either the displacement, strain, or stress field. In this conventional scenario, for hundreds of thousands of simulations, the best cost (close to zero) is retained as a solution.

On the other hand, the example method diagrammed in FIG. 4(c), which can be executed by the stress and fracture modeling engine 102, extends inversion for numerous kinds of data, and provides a much faster modeling engine 102. For example, a resulting fast and reliable stress inversion is described below. The different types of data can be weighted and combined together. The stress and fracture modeling engine 102 can quickly recover the tectonic event(s) as well as displacement discontinuity on faults using diverse data sets and sources, and then obtain an estimate of the displacement and perturbed strain and stress field anywhere within the medium, using data available from seismic interpretation, well bores, and field observations. Applying the principle of superposition allows a user to execute parameters estimation in a very fast manner.

A numerical technique for performing the example methods is described next. Then, a reduced remote tensor used for simulation is described, and then the principle of superposition itself is described. An estimate of the complexity is also described.

In one implementation, a formulation applied by the stress and fracture modeling engine 102 can be executed using IBEM3D, a successor of POLY3D (POLY3D is described by F. Maerten, P. G. Resor, D. D. Pollard, and L. Maerten, *Inverting for slip on three-dimensional fault surfaces using angular dislocations*, Bulletin of the Seismological Society of America, 95:1654-1665, 2005, and by A. L. Thomas, *Poly3D: a three-dimensional, polygonal element, displacement discontinuity boundary element computer program with applications to fractures, faults, and cavities in the earth's crust*, Master's thesis, Stanford University, 1995.) IBEM3D is a boundary element code based on the analytical solution of an angular dislocation in a homogeneous or inhomogeneous elastic whole- or half-space. An iterative solver is employed for speed considerations and for parallelization on multi-core architectures. (See, for example, F. Maerten, L. Maerten, and M. Cooke, *Solving 3d boundary element problems using constrained iterative approach*, Computational Geosciences, 2009.) However, inequality constraints cannot be used as they are nonlinear and the principle of superposition does not apply. In the selected code, faults are represented by triangulated surfaces with discontinuous displacement. The advantage is that three-dimensional fault surfaces more closely approximate curvi-planar surfaces and curved tip-lines without introducing overlaps or gaps.

Mixed boundary conditions may be prescribed, and when traction boundary conditions are specified, the initialization engine 304 solves for unknown Burgers's components. After the system is solved, it is possible to compute anywhere, within the whole- or half-space, displacement, strain or stress at observation points, as a post-process. Specifically, the stress field at any observation point is given by the perturbed stress field due to slipping faults plus the contribution of the remote stress. Consequently, obtaining only the perturbed stress field due to the slip on faults is not enough. Moreover, the estimation of fault slip from seismic interpretation is only given along the dip-direction. Nothing is known along the strike-direction, and a full mechanical scenario is necessary to recover the unknown components of the slip vector as it will impact the perturbed stress field. Changing the imposed far field stress (orientation and or relative magnitudes) modifies the slip distribution and consequently the perturbed stress field. In general, a code such as IBEM3D is well suited for computing the full displacement vectors on faults, and has been intensively optimized using an H-matrix technique. The unknown for purposes of modeling remains the estimation of the far field stress that has to be imposed as boundary conditions.

In an example method, which may be implemented by the stress and fracture modeling engine 102, a model composed of multiple fault surfaces is subjected to a constant far field stress tensor $\sigma_R$ defined in the global coordinate system by Equation (1):

$$\sigma_R = \begin{bmatrix} a_{11} & a_{12} & a_{13} \\ & a_{22} & a_{23} \\ & & a_{33} \end{bmatrix} \quad (1)$$

Assuming a sub-horizontal far field stress (but the present methodology is not restricted to that case), Equation (1) simplifies into Equation (2):

$$\sigma_R = \begin{bmatrix} a_{11} & a_{12} & 0 \\ & a_{22} & 0 \\ & & a_{33} \end{bmatrix} \quad (2)$$

Since the addition of a hydrostatic stress does not change $\sigma_R$, the far field stress tensor $\sigma_R$ can be written as in Equation (3):

$$\sigma_R = \begin{bmatrix} a_{11}-a_{33} & a_{12} & 0 \\ & a_{22}-a_{33} & 0 \\ & & 0 \end{bmatrix} = \begin{bmatrix} \bar{a}_{11} & \bar{a}_{12} \\ & \bar{a}_{22} \end{bmatrix} \quad (3)$$

Consequently, a definition of a far field stress with three unknowns is obtained, namely $\{\bar{a}_{11}, \bar{a}_{22}, \bar{a}_{12}\}$.

The far field stress tensor, as defined in Equation (3) can be computed using only two parameters instead of the three $\{\bar{a}_{11}, \bar{a}_{22}, \bar{a}_{12}\}$. Using spectral decomposition of the reduced $\sigma_R$, Equation (4) may be obtained:

$$\sigma_R = R_\theta^T R_\theta \quad (4)$$

where, as in Equation (5):

$$\sigma_R = \begin{bmatrix} \sigma_1 & 0 \\ & \sigma_2 \end{bmatrix} \quad (5)$$

the far field stress tensor $\sigma_R$ is the matrix of principal values, and in Equation (6):

$$R_\theta = \begin{bmatrix} \cos\theta & -\sin\theta \\ \sin\theta & \cos\theta \end{bmatrix} \quad (6)$$

is the rotation matrix around the global z-axis (since a sub-horizontal stress tensor is assumed).

By writing, in Equation (7):

$$\sigma_2 = k\sigma_1 \quad (7)$$

Equation (4) then transforms into Equation (8):

$$\sigma_R(\theta, k) = \sigma_1 R_\theta^T \begin{bmatrix} 1 & 0 \\ 0 & k \end{bmatrix} R_\theta \quad (8)$$

Omitting the scaling parameter $\sigma_1$ due to Property 1 discussed below (when $\sigma_1 = \delta$ in Property 1), $\sigma_R$ can be expressed as a functional of two parameters $\delta$ and k, as in Equation (9):

$$\sigma_R(\theta, k) = R_\theta^T \begin{bmatrix} 1 & 0 \\ 0 & k \end{bmatrix} R_\theta \quad (9)$$

These two parameters are naturally bounded by Equations (10):

$$\begin{cases} -\pi/2 \leq \theta \leq \pi/2 \\ -10 \leq k \leq 10 \end{cases} \quad (10)$$

assuming that uniaxial remote stress starts to occur when $k \geq 10$. For $k=1$, a hydrostatic stress tensor is found, which has no effect on the model. Also, using a lithostatic far field stress tensor (which is therefore a function of depth z) does not invalidate the presented technique, and Equation (9) transforms into Equation (11):

$$\sigma_R(\theta, k, z) = z R_\theta^T \begin{bmatrix} 1 & 0 \\ 0 & k \end{bmatrix} R_\theta \quad (11)$$

which is linearly dependent on z. The simplified tensor definition given by Equation (9) is used in the coming sections to determine $(\theta, k)$, or equivalently $\{\bar{a}_{11}, \bar{a}_{22}, \bar{a}_{12}\}$ according to measurements.

It is worth noting that even when 2-dimensional parameter-space is used for the Monte-Carlo simulation using $(\theta, k)$, three components are still used for the far field stress, specified by the parameters $(\alpha_1, \alpha_2, \alpha_3)$. The conversions are given by Expression (12):

$$(\theta, k) \rightarrow (\sigma_{00}, \sigma_{01}, \sigma_{11}) \rightarrow (\alpha_1, \alpha_2, \alpha_3) \quad (12)$$

where, in Equations (13):

$$\begin{cases} \sigma_{00} = \cos^2\theta + k\sin^2\theta \\ \sigma_{01} = (k-1)\cos\theta\sin\theta \\ \sigma_{11} = \cos^2\theta + k\sin^2\theta \end{cases} \quad (13)$$

and $(\alpha_1, \alpha_2, \alpha_3)$ are given by Equation (20), further below.

Principle of Superposition

The example stress and fracture modeling engine 102 uses the principle of superposition, a well-known principle in the physics of linear elasticity, to recover the displacement, strain and stress at any observation point P using the precomputed specific values from linearly independent simulations. The principle of superposition stipulates that a given value f can be determined by a linear combination of specific solutions.

In the stress and fracture modeling engine 102, recovering a far field stress implies recovering the three parameters $(\alpha_1, \alpha_2, \alpha_3)$. Therefore, the number of linearly independent solutions used is three. In other words, in Equation (14):

$$\begin{aligned} f = F(\sigma) &= F(\alpha_1 \sigma^{(1)} + \alpha_2 \sigma^{(2)} + \alpha_3 \sigma^{(3)}) \\ &= \alpha_1 F(\sigma^{(1)}) + \alpha_2 F(\sigma^{(2)}) + \alpha_3 F(\sigma^{(3)}) \\ &= \alpha_1 f_1 + \alpha_2 f_2 + \alpha_3 f_3 \end{aligned} \quad (14)$$

where $(\alpha_1, \alpha_2, \alpha_3)$ are real numbers, and $\sigma^{(i)}$ (for i=1 to 3) are three linearly independent remote stress tensors. If F is selected to be the strain, stress or displacement Green's functions, then the resulting values $\epsilon$, $\sigma$, and $u$, at P can be expressed as a combination of three specific solutions, as shown below. Thus, the strain, stress and displacement field for a tectonic loading are a linear combination of the three specific solutions, and are given by Equation (15):

$$\begin{cases} \varepsilon_P = \alpha_1 \varepsilon_P^{(1)} + \alpha_2 \varepsilon_P^{(2)} + \alpha_3 \varepsilon_P^{(3)} \\ \sigma_P = \alpha_1 \sigma_P^{(1)} + \alpha_2 \sigma_P^{(2)} + \alpha_3 \sigma_P^{(3)} \\ u_P = \alpha_1 u_P^{(1)} + \alpha_2 u_P^{(2)} + \alpha_3 u_P^{(3)} \end{cases} \quad (15)$$

Similarly, using $(\alpha_1, \alpha_2, \alpha_3)$ allows recovery of the displacement discontinuities on the faults, as in Equation (16):

$$b_e = \alpha_1 b_e^{(1)} + \alpha_2 b_e^{(2)} + \alpha_3 b_e^{(3)} \quad (16)$$

and any far field stress is also given as a combination of the three parameters, as in Equation (17):

$$\sigma_R = \alpha_1 \sigma_R^{(1)} + \alpha_2 \sigma_R^{(2)} + \alpha_3 \sigma_R^{(3)} \quad (17)$$

Complexity Estimate

Changing $\sigma_R$ usually requires recomputing the entire model in order to determine the corresponding unknown displacement discontinuities. Then, at any observation point P, the stress is determined as a superimposition of the far field stress $\sigma_R$ and the perturbed stress field due to slipping elements.

For a model made of n triangular discontinuous elements, computing the stress state at point P first requires solving for the unknown displacement discontinuities on triangular elements (for which the complexity is $O(n^2)$), and then performing approximately 350n multiplications using the standard method. By using the principle of superposition, on the other hand, the unknown displacement discontinuities on triangular elements do not have to be recomputed, and only 18 multiplications need be performed by the example stress and fracture modeling engine 102. The complexity is independent of the number of triangular elements within the model, and is constant in time.

Some direct applications of the example methods will now be described, such as real-time evaluation of deformation and the perturbed stress field while a user varies a far field stress parameter. Paleostress estimation using different data sets 302 is also presented further below, as is an example method to recover multiple tectonic phases, and a description of how the example method can be used for quality control during fault interpretation.

Real-Time Computation

Before describing the paleostress inversion method, another method is described first, for real-time computing displacement discontinuity on faults, and the displacement, strain, and stress fields at observation points while the orientation and/or magnitude of the far field stress is varied.

If the tectonic stress $\sigma_R$ is given and three independent solutions are known, there exists a unique triple $(\alpha_1, \alpha_2, \alpha_3)$ for which Equation (17) is honored, and Equations (15) and (16) can be applied.

In matrix form, Equation (17) is written in the format shown in Equation (18):

$$\begin{bmatrix} \sigma_{00}^{(1)} & \sigma_{00}^{(2)} & \sigma_{00}^{(3)} \\ \sigma_{01}^{(1)} & \sigma_{01}^{(2)} & \sigma_{01}^{(3)} \\ \sigma_{11}^{(1)} & \sigma_{11}^{(2)} & \sigma_{11}^{(3)} \end{bmatrix} \begin{Bmatrix} \alpha_1 \\ \alpha_2 \\ \alpha_3 \end{Bmatrix} = \begin{Bmatrix} \sigma_{00}^R \\ \sigma_{01}^R \\ \sigma_{11}^R \end{Bmatrix} \quad (18)$$

or, in compact form, as in Equation (19):

$$A_\sigma \alpha = \sigma_R \quad (19)$$

Since the three particular solutions $\sigma^{(i)}$ are linearly independent, the system can be inverted, which gives Equation (20):

$$\alpha = A_\sigma^{-1} \sigma_R \quad (20)$$

In Equation (20), $A_\sigma^{-1}$ is precomputed by the initialization engine 304. Given a user-selected remote stress, $\sigma_R$, the stress and fracture modeling engine 102 recovers the three parameters ($\alpha_1$, $\alpha_2$, $\alpha_3$), then the fault slip and the displacement, strain and stress field are computed in real-time using Equations (16) and (15), respectively. To do so, the three particular solutions of the displacement, strain and stress are stored at initialization at each observation point, as well as the displacement discontinuity on the faults. In one implementation, the example stress and fracture modeling engine 102 enables the user to vary the orientation and magnitude of $\sigma_R$, and to interactively display the associated deformation and perturbed stress field.

Paleostress Inversion Using Data Sets

As seen above, the main unknowns while doing forward modeling for the estimation of the slip distribution on faults, and consequently the associated perturbed stress field, are the orientation and relative magnitudes of the far field stress $\sigma_R$.

If field measurements are known at some given observation points (e.g., displacement, strain and/or stress, fractures orientation, secondary fault planes that formed in the vicinity of major faults, etc.), then it is possible to recover the triple ($\alpha_1$, $\alpha_2$, $\alpha_3$), and therefore also recover the tectonic stress $\sigma_R$ and the corresponding tectonic regime (see Appendix A, below). The next section describes the method of resolution and the cost functions used to minimize cost for different types of data sets 302.

Method of Resolution

Applying a Monte Carlo technique allows the parameters ($\alpha_1$, $\alpha_2$, $\alpha_3$) to be found, which minimize the cost functions when given three independent far field stresses (see Equation 15). However, even if ($\alpha_1$, $\alpha_2$, $\alpha_3$) imply a 3-dimensional parameters-space, this space can be reduced to two dimensions (namely, to the parameters θ and k), the conversion being given by Equation (20) and (θ, k)→($\sigma_{00}$, $\sigma_{01}$, $\sigma_{11}$)→($\alpha_1$, $\alpha_2$, $\alpha_3$), where, in Equations (21):

$$\begin{cases} \sigma_{00} = \cos^2\theta + k\sin^2\theta \\ \sigma_{01} = (k-1)\cos\theta\sin\theta \\ \sigma_{11} = \cos^2\theta + k\sin^2\theta \end{cases} \quad (21)$$

(see also FIG. 4(c) and Algorithm 1 for a detailed description). Consequently, the searching method (the search for optimized parameters) is accelerated by reducing the parameters-space by one dimension.

A simple sampling method can be performed by considering a two-dimensional rectangular domain for which the axes correspond to θ and k. The 2D-domain is sampled randomly with $n_p$ points, and the associated cost function (to be defined in the coming sections) is used to determine the point of minimum cost. A refinement is then created around the selected point and the procedure is repeated with a smaller domain. Algorithm (1) depicts a simplified version of the example procedure, for which there is no refinement. The example sampling method presented here can be greatly optimized by various techniques.

---

ALGORITHM (1): Paleostress Estimation

Input: Faults geometry
Input: Data set
Output: $\sigma_R$ // the estimated paleostress
Initialize: Compute 3 simulations using 3 linearly independent $\sigma_R^{(i)}$ ($1 \le i \le 3$) and the faults geometry. Store the resulting displacement and stress fields at data points, and the displacement discontinuity at faults, if necessary.
Let c = 1 // initial cost
Let α = (0,0,0,) // initial (α) solution
for i = 1 to $n_p$ do
    Randomly generate $\theta \in \left[-\frac{\pi}{2}, \frac{\pi}{2}\right]$
    Randomly generate k ∈ [−10,10]
    // Convert (θ, k) ∈ $\Re^2$ to (α) ∈ $\Re^3$
    Compute $R_\theta$ using Equation (6)
    Compute $\sigma_R$ (θ, k) using Equation (9)
    Compute σ using Equation (20)
    // Compute the corresponding cost
    d = cost(α, data set)
    if d ≤ c then
        $\bar{\alpha} = \alpha$
        c = d
    end
end $$\sigma_R = \sum_{i=1}^{3} \bar{\alpha}_i \sigma_R^i$$

---

Data Sets

The particularity of this method lies in a fact that many different kinds of data sets 302 can be used to constrain the inversion. Two groups of data are presented in the following sections: the first one includes only orientation information and the second includes displacement and/or stress magnitude information.

Without Magnitude Information from the Data Set

For opening fractures (e.g., joints, veins, dikes) the orientation of the normal to the fracture plane indicates the direction of the least compressive stress direction in 3D ($\sigma_3$). Similarly, the normals to pressure solution seams and stylolites indicate the direction of the most compressive stress ($\sigma_1$). Using measurements of the orientations of fractures, pressure solution seams, and stylolites allows the stress and fracture modeling engine 102 to recover the tectonic regime which generated such features.

Figure 5:
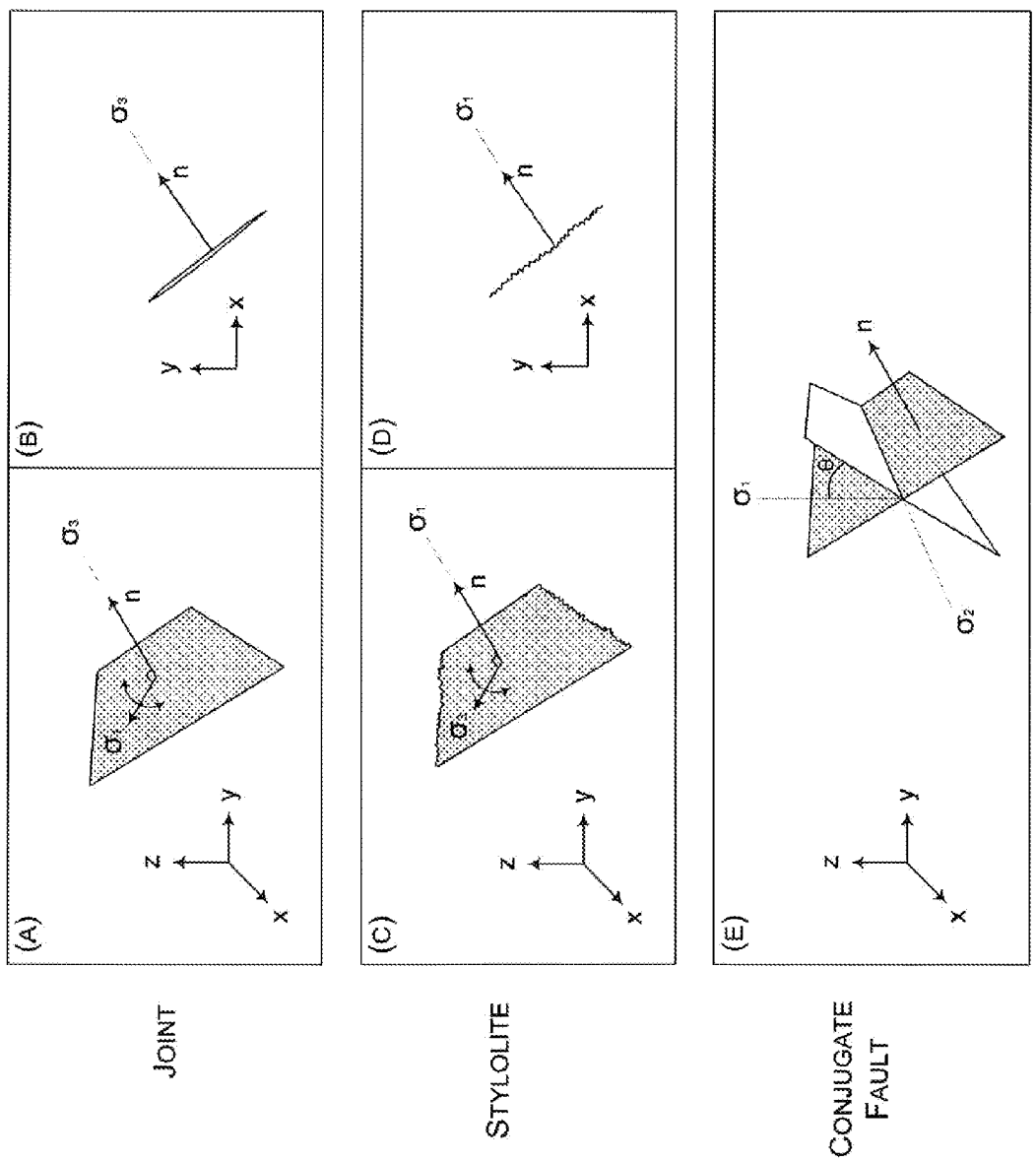
FIG. 5 is a diagram of an example method applied to fracture and conjugate fault planes using data sets without magnitude information.

At any observation point P, the local perturbed stress field can be determined easily from a numerical point of view by using three linearly independent simulations. FIG. 5 shows fracture and conjugate fault planes. FIG. 5(a) shows orientation of $\sigma_3$ relative to an opening fracture (joints, veins, dikes) given by its normal $\vec{n}$ in 3D. FIG. 5(b) shows the same as FIG. 5(a) except for an orientation of $\sigma_3$ relative to a joint given by its projected normal $\vec{n}$ (e.g., trace on outcrop). FIG. 5(c) and FIG. 5(d) show the same as FIG. 5(a) and FIG. 5(b) except shown for a stylolite. FIG. 5(e) shows orientation of $\sigma_2$ and $\sigma_1$ relative to conjugate fault-planes given by one of the normal $\vec{n}$ in 3D and the internal friction angle θ. The goal is to determine the best fit of the far field stress $\sigma_R$, and therefore parameters ($\alpha_1$, $\alpha_2$, $\alpha_3$), given some orientations of opening fracture planes for which the normals coincide with the directions of the least compressive stress $\sigma_3^P$ at P, or equivalently for which the plane of the fracture contains the most compressive stress ($\sigma_1$), as in FIG. 5(a) and FIG. 5(b).

By varying ($\alpha_1$, $\alpha_2$, $\alpha_3$), the state of stress at any observation point P can be computed quickly using the three precomputed models. The cost function to minimize is given in Equation (22):

$$f_{frac}(\alpha_1, \alpha_2, \alpha_3) = \frac{1}{2m}\sum_P \left(\left(\vec{\sigma}_1^P \cdot \vec{n}^P\right)^2 + \left(\vec{\sigma}_2^P \cdot \vec{n}^P\right)^2\right)^{1/2} \quad (22)$$

where "." is the dot-product, $\vec{n}$ is the normal to a fracture plane, and m is the number of observation points.
The minimization of a function of the three parameters is expressed by Equation (23):

$$F_{frac} = \min_{\alpha_1,\alpha_2,\alpha_3}\{f_{frac}(\alpha_1,\alpha_2,\alpha_3)\} \quad (23)$$

Similarly, for pressure solution seams and stylolites, the cost function is defined as in Equation (22) using the least compressive stress $\sigma_3$ as in Equation (24) (see FIG. 5(c) and FIG. 5(d)):

$$f_{styl}(\alpha_1, \alpha_2, \alpha_3) = \frac{1}{2m}\sum_P \left(\left(\vec{\sigma}_3^P \cdot \vec{n}^P\right)^2 + \left(\vec{\sigma}_2^P \cdot \vec{n}^P\right)^2\right)^{1/2} \quad (24)$$

Using Secondary Fault Planes

The orientation of secondary fault planes that develop in the vicinity of larger active faults may be estimated using a Coulomb failure criteria, defined by Equation (25):

$$\tan(2\theta) = 1/\mu \quad (25)$$

where $\theta$ is the angle of the failure planes to the maximum principal compressive stress $\sigma_1$ and $\mu$ is the coefficient of internal friction. Two conjugate failure planes intersect along $\sigma_2$ and the fault orientation is influenced only by the orientation of the principal stresses and the value of the friction.

The cost function is therefore defined by Equation (26):

$$f_{fault}(\alpha_1, \alpha_2, \alpha_3) = \frac{1}{2m}\sum_P \left[\left(\vec{\sigma}_2^P \cdot \vec{n}^P\right)^2 + \left(\frac{|\sin^{-1}(\vec{\sigma}_1^P \cdot \vec{n}^P)| - \theta}{\pi}\right)^2\right]^{1/2} \quad (26)$$

where $\sigma_1$ is the direction of the most compressive stress and $\sigma_2$ is the direction of the intermediate principal stress. The first term of the right hand side in Equation (26) maintains an orthogonality between the computed $\sigma_2$ and the normal of the fault plane, whereas the second term ensures that the angle between the computed $\sigma_1$ and the fault plane is close to $\theta$ (see FIG. 5(e)).

Example 1

Normal and Thrust Fault

Figure 6:
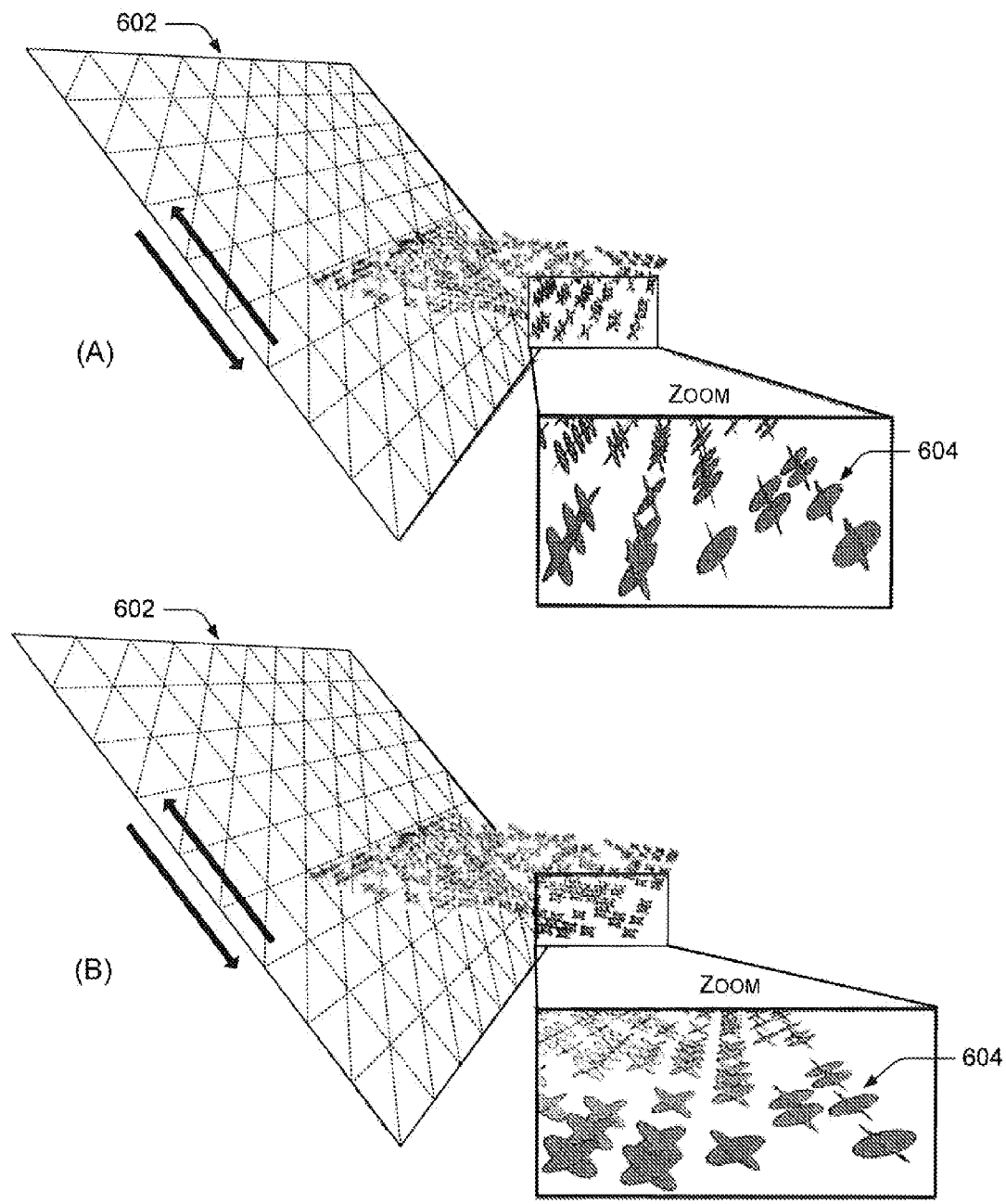
FIG. 6 is diagram comparing example stress inversion for normal fault and thrust fault configurations.

FIG. 6 shows a synthetic example using an inclined planar fault as one of two conjugate fault planes selected randomly. The inclination of the two conjugate fault planes is presented for a normal fault configuration (FIG. 6(a)) and a thrust fault configuration (FIG. 6(b)). Dip-azimuth and dip-angle of each conjugate fault plane are used to perform the inversion and the internal friction angle is $\theta=30$, The main active fault is represented by the inclined rectangular plane 602.

Initially, the model is constrained by a far field stress at some observation points 604, where the two conjugate planes are computed using an internal friction angle of 30 degrees. Then, for each observation point 604, one of the conjugate fault planes is chosen randomly and used as input data for the stress inversion.

Figure 7:
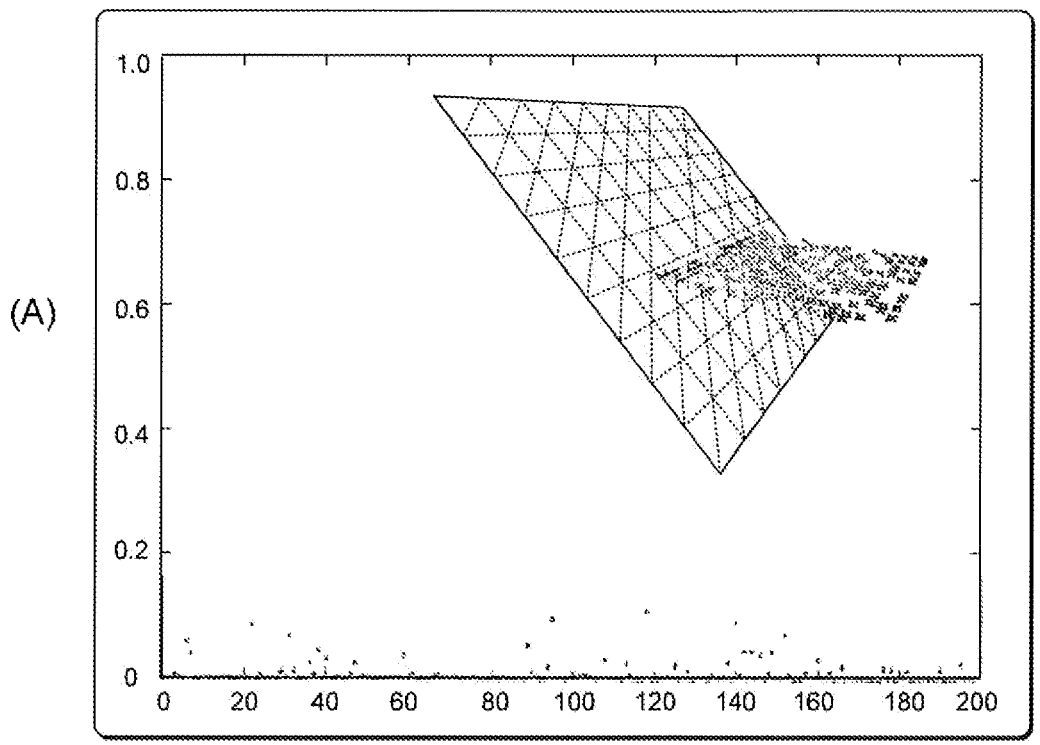
FIG. 7 is a diagram of cost functions for the stress inversions of FIG. 6.
Figure 7:
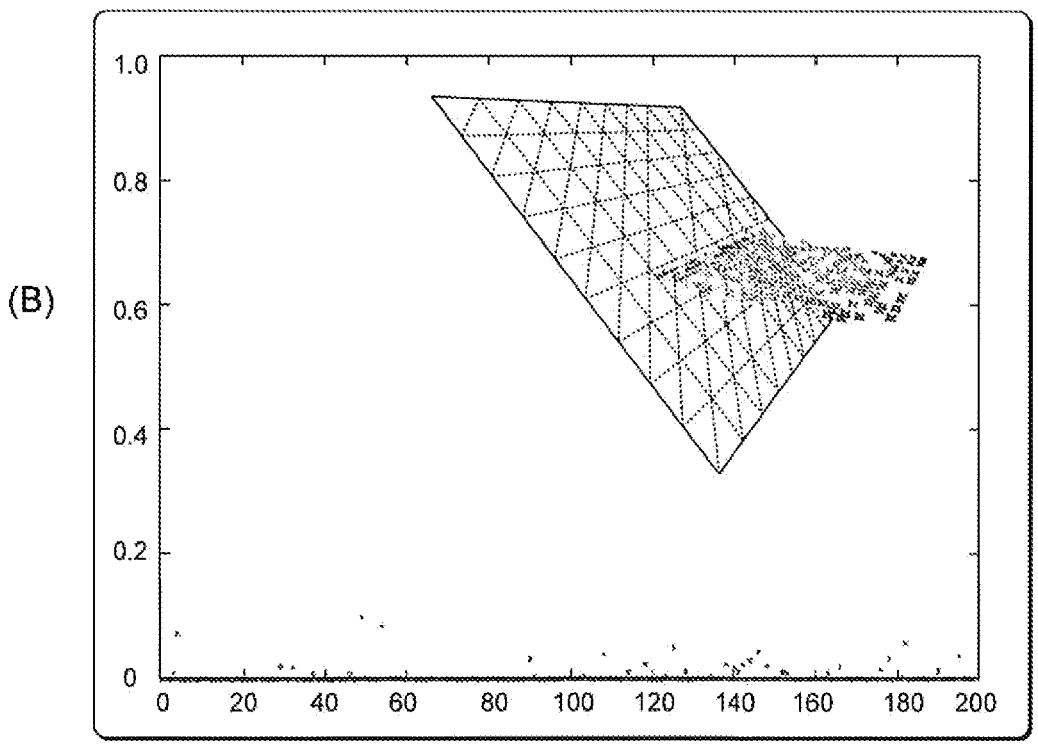

FIG. 7 shows the cost function for the synthetic example from FIG. 6. FIG. 7(a) shows the cost function for the normal fault, and FIG. 7(b) shows the cost function for the thrust fault. In both cases, the recovered regional stress tensor, displacement on fault, and predicted conjugate fault planes provide a good match with the initial synthetic model.

Using Fault Striations

In the case of fault striations, the cost function is defined as in Equation (27):

$$f_{stri}(\alpha_1, \alpha_2, \alpha_3) = \frac{1}{m}\sum_P \left(1 - \left(1 - \vec{d}_e^c \cdot \vec{d}_e^m\right)^2\right)^{1/2} \quad (27)$$

where $\vec{d}_e^c$ and $\vec{d}_e^m$ represent the normalized slip vector from a simulation and the measured slip vector, respectively.

Data Sets Containing Magnitude Information

The magnitude of displacements may be used to determine not only the stress orientation, but also the magnitude of the remote stress tensor, instead of just the principal stress ratio.

To do so, the procedure is similar to that described previously. However, given Equations (15) and (16), it is evident that there exists a parameter $\delta$ for which the computed displacement discontinuity on faults and the displacement, strain and stress fields at observation points scale linearly with the imposed far field stress. In other words, as in Equation (28):

$$\begin{cases} \delta\sigma_R \Rightarrow \delta b_e \\ \delta\sigma_R \Rightarrow \delta u_P \\ \delta\sigma_R \Rightarrow \delta\varepsilon_P \\ \delta\sigma_R \Rightarrow \delta\sigma_P \end{cases} \quad (28)$$

This leads to the following property:

Property 1: Scaling the far field stress by $\delta \in \Re$ scales the displacement discontinuity on faults as well as the displacement, strain, and stress fields at observation points by $\delta$.

Using this property, all measurements at data points are globally normalized before any computation and the scaling factor is noted (the simulations are also normalized, but the scaling factor is irrelevant). After the system is solved, the recovered far field stress, displacement and stress fields are scaled back by a factor of $\delta_m^{-1}$.

Using GPS Data

In the case of a GPS data set, the cost function is defined in Equation (29):

$$f_{gps}(\alpha_1, \alpha_2, \alpha_3) = \frac{1}{2m}\sum_P \left[\left(1 - \frac{\vec{u}_P^m \cdot \vec{u}_P^c}{\|\vec{u}_P^c\|\|\vec{u}_P^m\|}\right)^2 + \left(1 + \frac{\|\vec{u}_P^m\|}{\|\vec{u}_P^c\|}\right)^2 (\vec{u}_P^c - \vec{u}_P^m)^2\right]^{1/2} \quad (29)$$

where $\vec{u}_P^m$ is the globally normalized measured elevation changed at point P from the horizon and $\vec{u}_P^c$ is the globally normalized computed elevation change for a given set of parameters ($\alpha_1, \alpha_2, \alpha_3$). The first term on the right hand side in Equation (29) represents a minimization of the angle between the two displacement vectors, whereas the second term represents a minimization of the difference of the norm.

Using InSAR Data

When using an InSAR data set, there are two possibilities. Either the global displacement vectors of the measures are computed using the displacement u along the direction of the satellite line of sight $\vec{s}$, in which case Equation (30) is used:

$$\vec{u}_P^m = \vec{u}_{insar} = u \cdot \vec{s} \tag{30}$$

and the same procedure that is used for the GPS data set (above) is applied with the computed $\vec{u}_P^c$, or, the computed displacement vectors are computed along the satellite line of sight, in which case Equation (31) is used:

$$\vec{u}_P^c = \vec{u} \cdot \vec{s} \tag{31}$$

where "·" is the dot product. The cost function is consequently given by Equation (32):

$$f_{insar}(\alpha_1, \alpha_2, \alpha_3) = \frac{1}{m} \sum_P \left(1 - \left(\frac{u_P^c}{u_P^m}\right)^2\right)^{1/2} \tag{32}$$

Example

Figure 8:
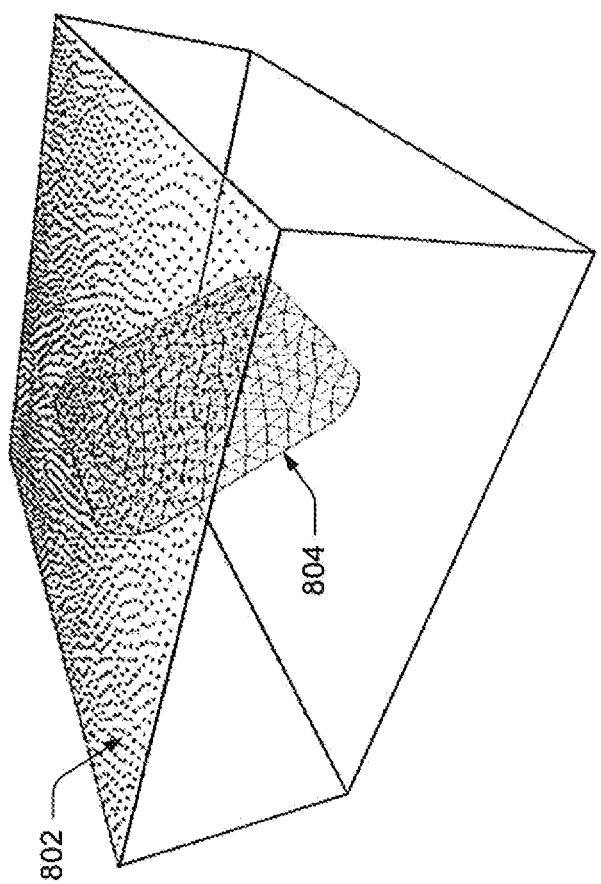
FIG. 8 is a diagram of an example model configuration showing InSAR data points and a fault surface.
Figure 9:
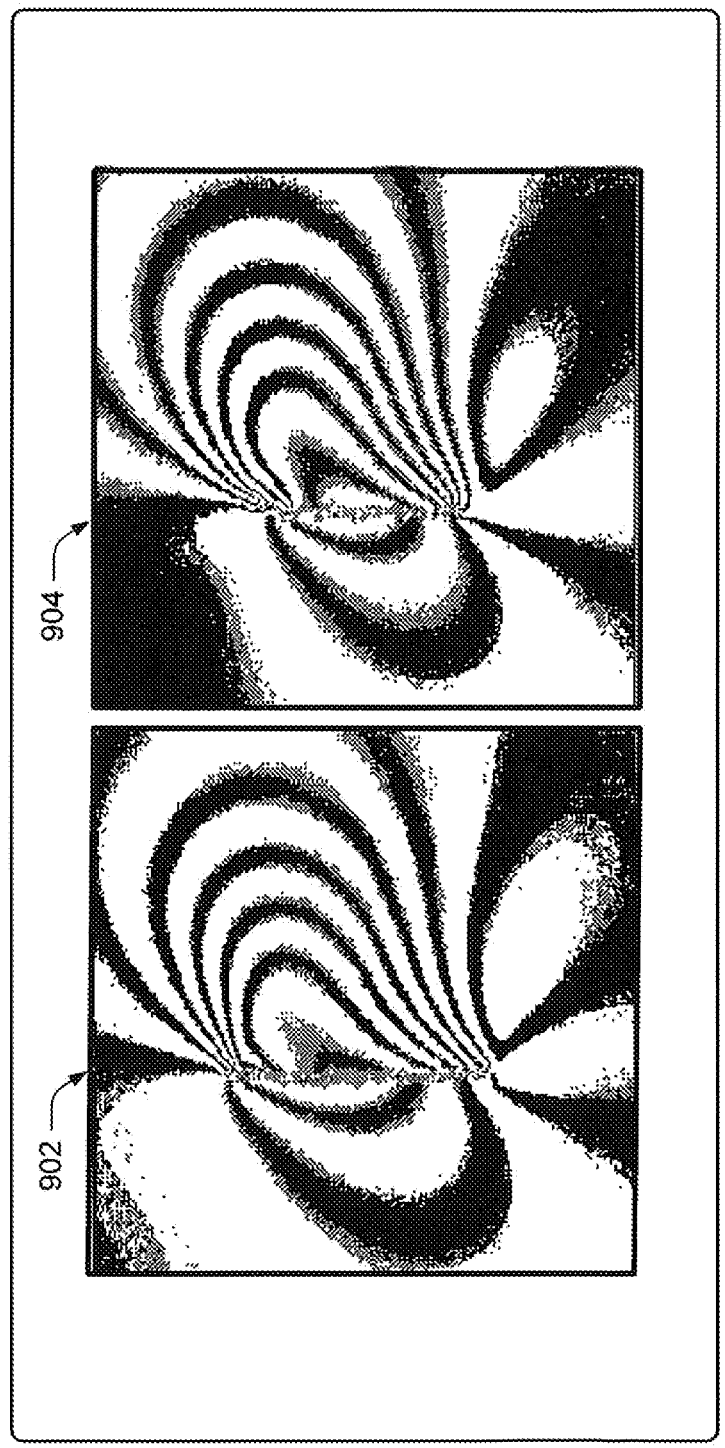
FIG. 9 is a diagram comparing fringes from an original InSAR grid and an InSAR grid recovered by an example stress and fracture modeling method using the principle of superposition.
Figure 10:
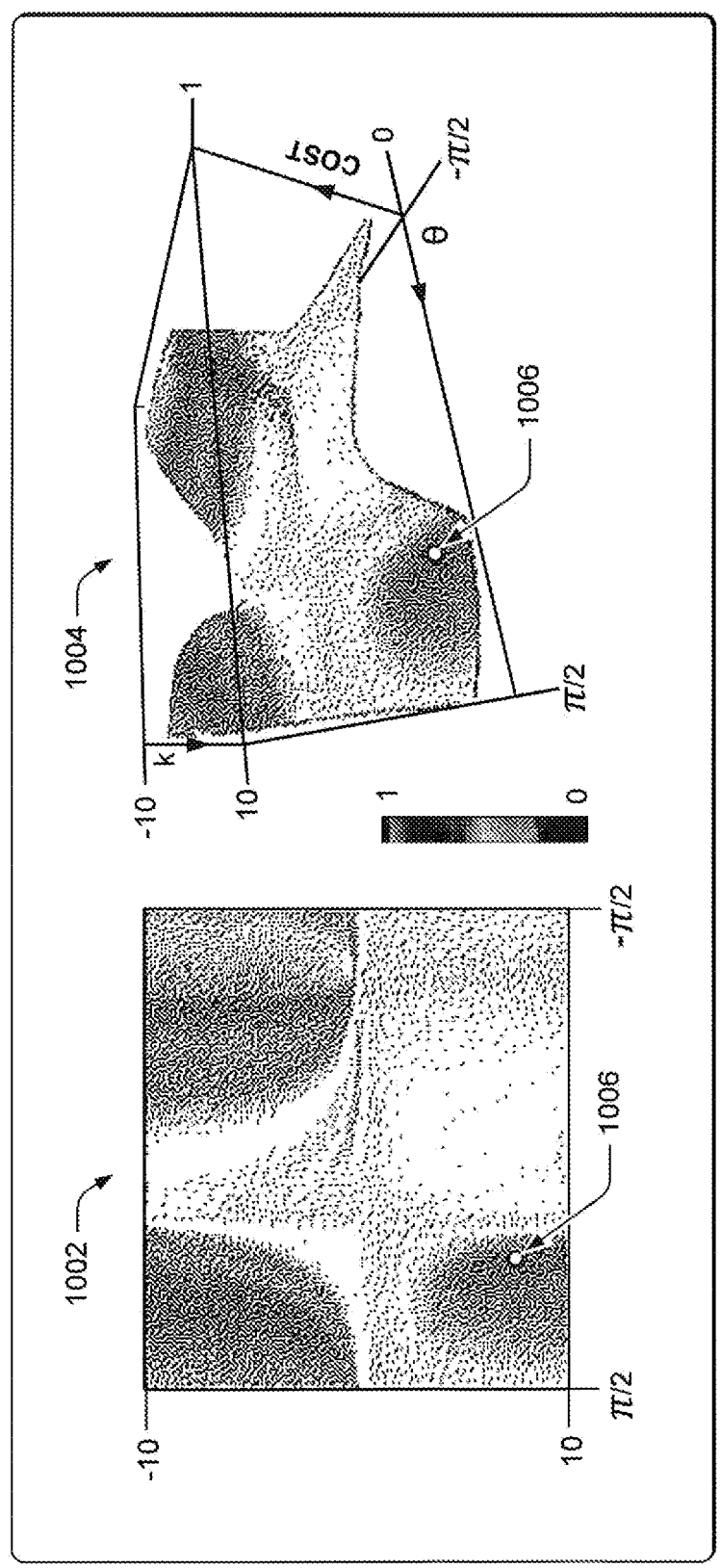
FIG. 10 is a diagram showing a top view and a front perspective view of a plot of the cost surface for an example method applied to the InSAR case of FIGS. 8-9, with cost solution indicated.

FIGS. 8, 9, and 10 present a synthetic example using an InSAR data set. FIG. 8 shows a model configuration showing the InSAR data points 802 as well as the fault surface 804. FIG. 9 shows a comparison of the fringes from the original InSAR grid 902 and the recovered InSAR grid 904. FIG. 10 shows a plot of the cost surface, as a function of θ (x-axis) and k (y-axis). On the left is a top view 1002 of the plot, and on the right is a front perspective view 1004 of the plot. The minimized cost solution 1006 in each view is marked by a small white circle (1006).

To utilize an InSAR data set, a forward model is run using one fault plane 804 and one observation grid (FIG. 8) at the surface of the half-space (see surface holding the data points 802). A satellite direction is selected, and for each observation point 802, the displacement along the satellite line of sight is computed. Then, an example stress and fracture modeling method described herein is applied using the second form of the InSAR cost function given in Equation (32). FIG. 9 compares the original interferogram 902 (left) to the recovered interferogram 904 (right). FIG. 10 shows how complex the cost surface can be, even for a simple synthetic model. In one implementation, the cost surface was sampled with 500,000 data points 802 (number of simulations), and took 18 seconds on an average laptop computer with a 2 GHz processor and with 2 GB of RAM running on Linux Ubuntu version 8.10, 32 bits.

Using a Flattened Horizon

Using the mean plane of a given seismic horizon (flattened horizon), the stress and fracture modeling engine 102 first computes the change in elevation for each point making the horizon. Then, the GPS cost function is used, for which only the $u_z$ component is provided, giving Equation (33):

$$f_{horizon}(\alpha_1, \alpha_2, \alpha_3) = \frac{1}{m} \sum_P \left(1 - \left(\frac{u_P^c}{u_P^m}\right)^2\right)^{1/2} \tag{33}$$

If pre- or post-folding of the area is observed, the mean plane can no longer be used as a proxy. Therefore, a smooth and continuous fitting surface has to be constructed which must remove the faulting deformations while keeping the folds. Then, the same procedure as for the mean plane is used to estimate the paleostress. In some circumstances and prior to defining the continuous fitting surface, it is sometimes necessary to filter the input horizon from noises possessing high frequencies, such as corrugations and bumps, while preserving natural deformations.

Example

Figure 11:
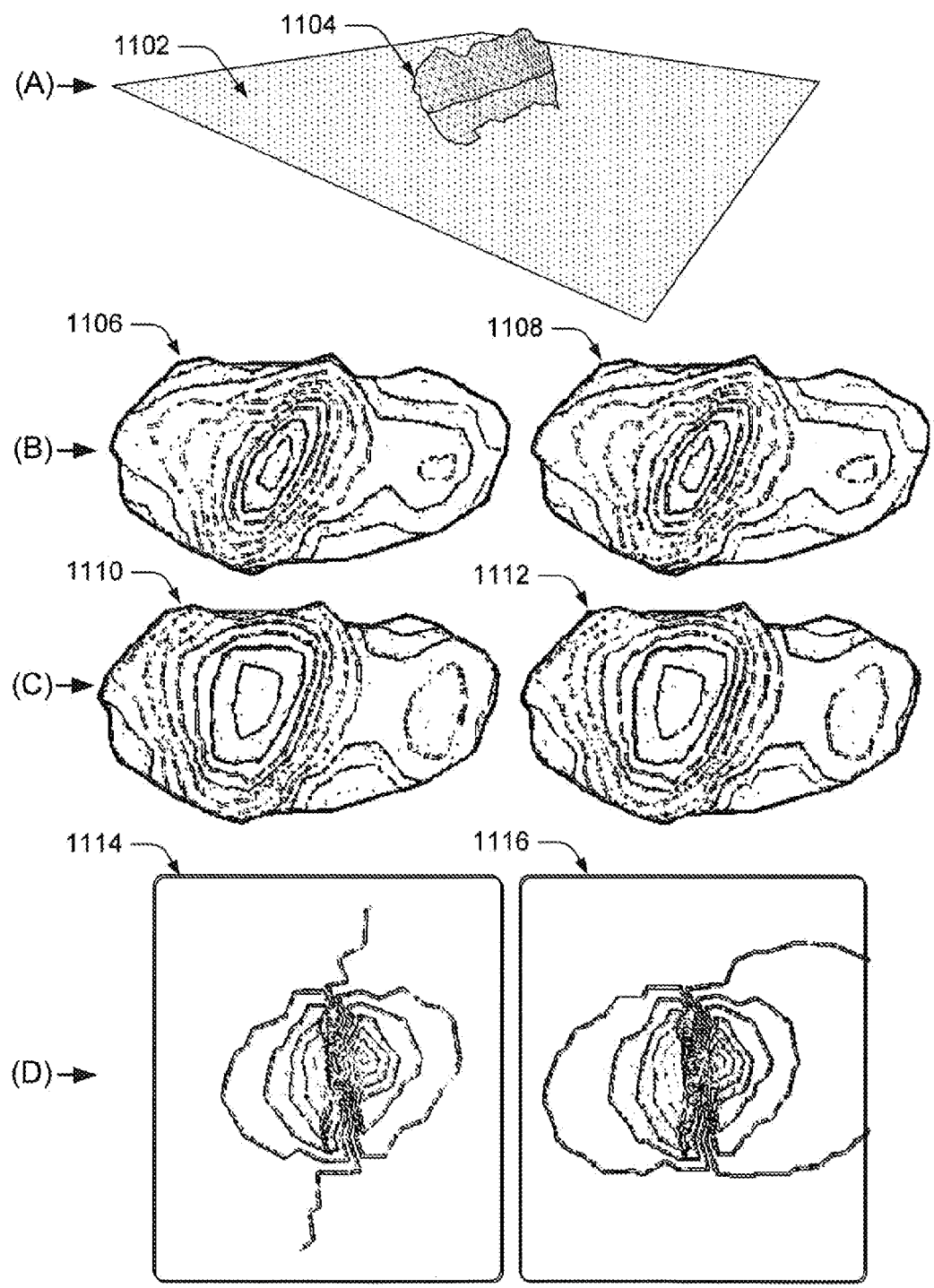
FIG. 11 is a diagram showing results of an example method applied to a flattened horizon scenario.

FIG. 11 shows results when applying an example stress and fracture modeling method to a synthetic example using a flattened horizon. FIG. 11(a) presents a model configuration showing the horizon 1102 and the fault surface 1104. FIG. 11(b) shows a comparison of the original dip-slip 1106 (left) and the recovered dip-slip 1108 (right). FIG. 11(c) shows a comparison of the original strike-slip 1110 (left) and the recovered strike-slip 1112 (right). FIG. 11(d) shows original vertical displacement 1114 (left) from the flattened horizon (left) and recovered vertical displacement 1116 (right) from the flattened horizon.

In the example shown in FIG. 11, a complex shaped fault is initially constrained by a far field stress, and consequently slips to accommodate the remote stress. At each point of an observation plane cross-cutting the fault, the stress and fracture modeling engine 102 computes the resulting displacement vector and deforms the grid accordingly. Then, inversion takes place using the fault geometry. After flattening the deformed grid, the change in elevation for each point is used to constrain the inversion and to recover the previously imposed far field stress as well as the fault slip and the displacement field. The comparison of the original and inverted dip-slip (FIG. 11(b)) and strike-slip (FIG. 11(c)) show that they match well (same scale). A good match is also observed for the displacement field at the observation grid (FIG. 11(d)).

Using Dip-Slip Information

When dip-slip data is used, the cost function is defined as in Equation (34):

$$f_{ds}(\alpha_1, \alpha_2, \alpha_3) = \frac{1}{m} \sum_P \left(1 - \left(\frac{b_e^c}{b_e^m}\right)^2\right)^{1/2} \tag{34}$$

where $b_e^m$ is the measured dip-slip magnitude for a triangular element e, and $b_e^c$ is the computed dip-slip magnitude.

Using all Available Information

The example stress and fracture modeling engine 102 can combine the previously described cost functions to better constrain the stress inversion using all available data (e.g., fault and fracture plane orientation data, GPS data, InSAR data, flattened horizons data, dip-slip measurements from seismic reflection, fault striations, etc.). Furthermore, data can be weighted differently, and each datum can also support a weight for each coordinate.

Multiple Tectonic Events

For multiple tectonic events, it is possible to recover the major ones, e.g., those for which the tectonic regime and/or the orientation and/or magnitude are noticeably different. Algorithm (2), below, presents a way to determine different events from fracture orientation (joints, stylolites, conjugate fault planes) measured along well bores.

After doing a first simulation, a cost is attached at each observation point which shows the confidence of the recovered tectonic stress relative to the data attached to that observation point. A cost of zero means a good confidence, while a cost of one means a bad confidence. See FIG. 7 for an example plot of the cost. By selecting only data points that are under a given threshold value and running another simulation with these points, it is possible to extract a more precise paleostress value. Then, the remaining data points above the threshold value are used to run another simulation with the paleostress state to recover another tectonic event. If the graph of the new cost shows disparities, the example method above is repeated until satisfactory results are achieved. During the determination of the tectonic phases, the observation points are classified in their respective tectonic event. However, the chronology of the tectonic phases remains undetermined.

---
ALGORITHM (2): Detecting Multiple Tectonic Events
---
Input: ∈ as a user threshold in [0, 1]
Input: S = all fractures from all wells
Let: T = ∅
while S ≠ ∅ do
    Simulations: Compute the cost for each fracture in S
    if max(cost) < ∈ then
        Detect a tectonic event $\sigma_R$ for fractures in S
        if T = ∅ then
            Terminate
        else
            S = T
            T = ∅
            continue
    end
    S = fractures below ∈
    T + = fractures above ∈
end

---

Seismic Interpretation Quality Control

It is useful to have a method for quality control (QC) for interpreted faults geometries from seismic interpretation. The basic idea is to use the fracture orientations from well bores to recover the far field stress and the displacement discontinuities on active faults. Then, the computed displacement field is used to deform the initially flattened horizons. The geometry of the resulting deformed horizons can be compared with the interpreted ones. If some mismatches are clearly identified (e.g., interpreted uplift and computed subsidence), then the fault interpretation is possibly false. For example, an interpreted fault might dip in the wrong direction. Note that an unfolded horizon can be approximated by its mean plane, as described above in relation to flattened horizons.

Conclusion and Perspectives

The example stress and fracture modeling engine 102 applies the property of superposition that is inherent to linear elasticity to execute real-time computation of the perturbed stress and displacement field around a complexly faulted area, as well as the displacement discontinuity on faults. Furthermore, the formulation executed by the example stress and fracture modeling engine 102 enables rapid paleostress inversion using multiple types of data such as fracture orientation, secondary fault planes, GPS, InSAR, fault throw, and fault slickenlines. In one implementation, using only fracture orientation and/or secondary fault planes from well bores, the stress and fracture modeling engine 102 recovers one or more tectonic events, the recovered stress tensor being given by the orientation and ratio of the principal magnitudes. The example stress and fracture modeling engine 102 and associated methods can be applied across a broad range of applications, including stress interpolation in a complexly faulted reservoir, fractures prediction, quality control on interpreted faults, real-time computation of perturbed stress and displacement fields while doing interactive parameter estimation, fracture prediction, discernment of induced fracturing from preexisting fractures, and so forth.

In a variation, another important application of the stress and fracture modeling engine 102 and associated methods is evaluation of the perturbed stress field (and therefore the tectonic event(s)) for recovering "shale gas." Since shale has low matrix permeability, gas production in commercial quantities requires fractures to provide permeability. This is typically done by hydraulic fracturing to create extensive artificial fractures around well bores, and therefore requires a good understanding of how fractures will propagate according to the perturbed stress field.

Example Methods

Figure 12:
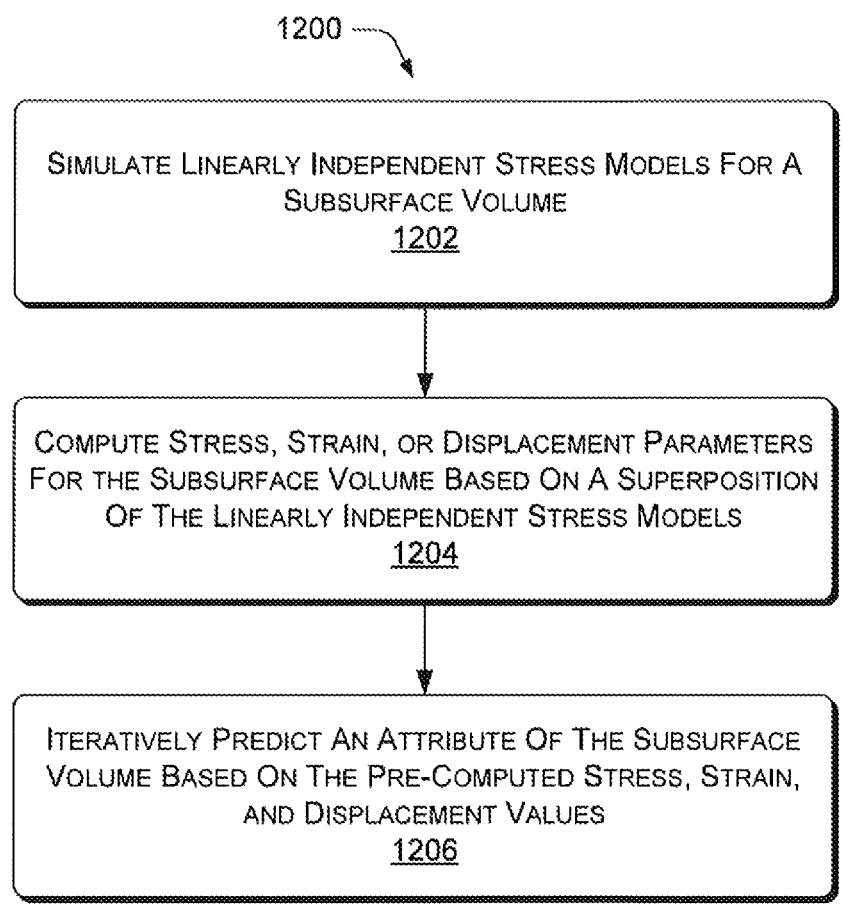
FIG. 12 is a flow diagram of an example method of stress and fracture modeling using the principle of superposition.

FIG. 12 shows an example method 1200 of stress and fracture modeling using the principle of superposition. In the flow diagram, the operations are summarized in individual blocks. The example method 1200 may be performed by hardware or combinations of hardware and software, for example, by the example stress and fracture modeling engine.

At block 1202, linearly independent stress models for a subsurface volume are simulated.

At block 1204, stress, strain, and/or displacement parameters for the subsurface volume are computed, based on a superposition of the linearly independent stress models.

At block 1206, an attribute of the subsurface volume is iteratively predicted based on the precomputed stress, strain, and/or displacement values.

Figure 13:
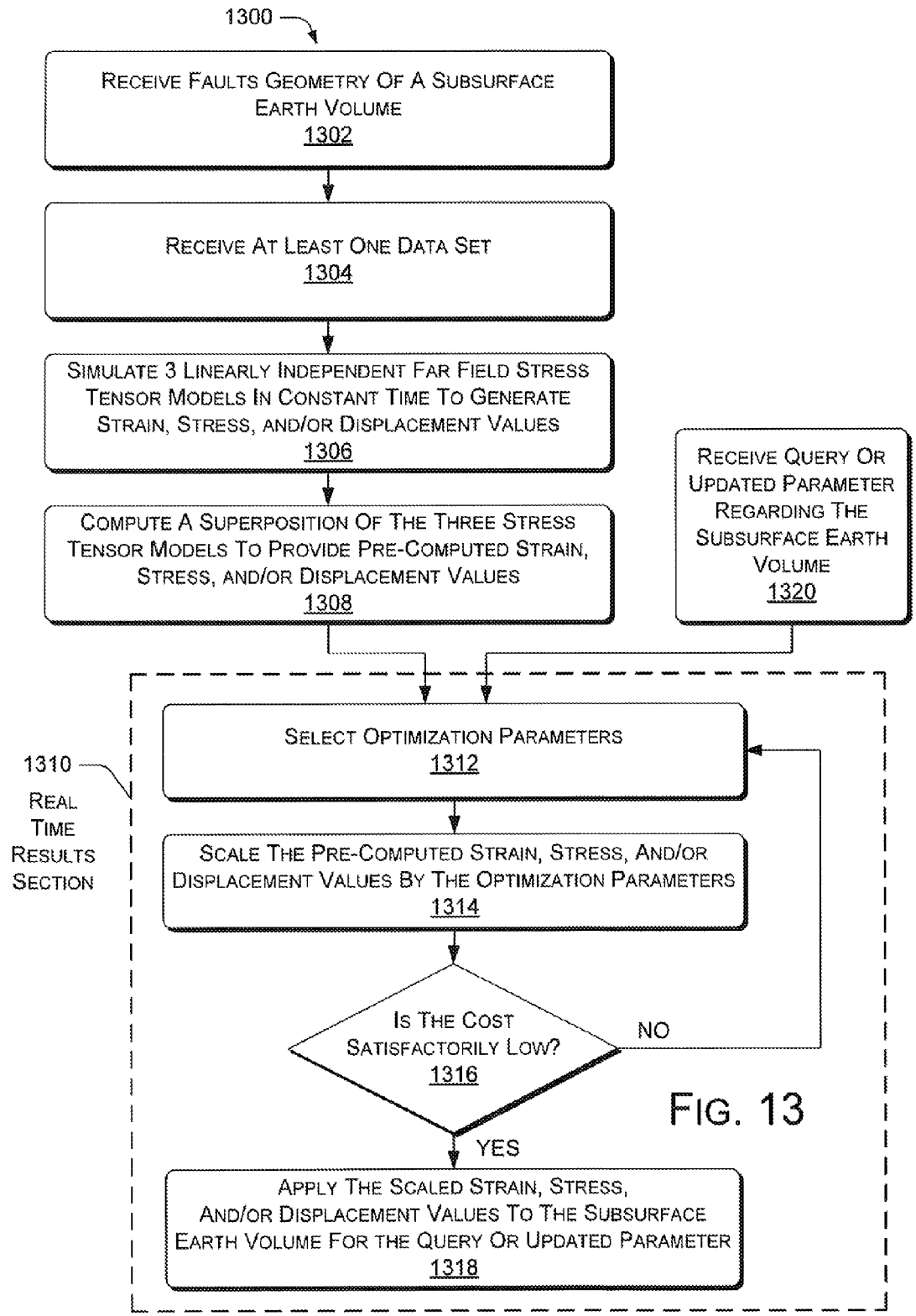
FIG. 13 is a flow diagram of an example method of stress and fracture modeling using the principle of superposition and a cost function.

FIG. 13 shows an example method 1300 of stress and fracture modeling using the principle of superposition. In the flow diagram, the operations are summarized in individual blocks. The example method 1300 may be performed by hardware or combinations of hardware and software, for example, by the example stress and fracture modeling engine.

At block 1302, faults geometry for a subsurface earth volume is received.

At block 1304, at least one data set associated with the subsurface earth volume is also received.

At block 1306, three linearly independent far field stress tensor models are simulated in constant time to generate strain, stress, and/or displacement values.

At block 1308, a superposition of the three linearly independent far field stress tensor models is computed to provide precomputed strain, stress, and/or displacement values.

At block 1310, a post-process segment of the method commences, that can compute numerous real-time results based on the principle of superposition.

At block 1312, optimization parameters for each of the linearly independent far field stress tensor models are selected.

At block 1314, the precomputed stress, strain, and/or displacement values are scaled by the optimization parameters.

At block 1316, a cost associated with the scaled precomputed stress, strain, and/or displacement values is evaluated. If the cost is not satisfactory, then the method loops back to block 1312 to select new optimization parameters. If the cost is satisfactory, then the method continues to block 1318.

At block 1318, the scaled strain, stress, and/or displacement values are applied to the subsurface earth volume, e.g., with respect to a query about the subsurface earth volume or in response to an updated parameter about the subsurface earth volume.

At block 1320, a query or updated parameter regarding the subsurface earth volume is received, that seeds or initiates generation of the post-process results in the real-time results section (1310) of the method 1300.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A method comprising:
receiving values of a perturbed stress field associated with a fractured region of earth, the values calculated via at least three linearly independent numerical simulations;
receiving values of at least three far field stress vectors, the values used as boundary conditions for the numerical simulations;
based on the values of the at least three far field stress vectors, building and inverting a stress matrix that comprises columns representing the far field stress vectors to generate an inverted stress matrix;
based at least in part on the values of the perturbed stress field and the inverted stress matrix, minimizing a cost function to compute values of a parameter vector;
based at least in part on the values of the parameter vector, computing values of a paleostress vector associated with the fractured region of earth;
determining a tectonic regime based at least in part on the values of the paleostress vector; and
associating the tectonic regime with at least one fault of the fractured region of earth.

2. The method of claim 1, being based at least in part on field data, wherein the field data comprise one or more of multiple types of geologic data obtained from multiple sources, comprising one of seismic interpretation data, well bore data, or field observation data; and wherein the multiple types of geologic data comprise one of fault geometry data, fracture orientation data, stylolites orientation data, secondary fault plane data, fault throw data, slickenline data, global positioning system (GPS) data, interferometric synthetic aperture radar (InSAR) data, laser ranging data, tilt-meter data, displacement data for a geologic fault, or stress magnitude data for the geologic fault.

3. The method of claim 1, further comprising detecting multiple tectonic events.

4. The method of claim 1, further comprising applying a Monte Carlo technique for iteratively minimizing the cost function.

5. A non-transitory computer-readable storage medium tangibly comprising instructions, which when executed by a computer, perform a process, including:
receiving fault geometry data for one or more faults in a subsurface volume;
representing the one or more faults in the subsurface volume as a model comprising triangulated surfaces with discontinuous displacements;
receiving at least one data set containing data points of collected data including fault orientation data, displacement data, and/or stress magnitude data in the subsurface volume;
simulating at least three linearly independent far field stress tensor models in constant time to generate at least three sets of component strain, stress, and/or displacement values for each of the data points;
computing strain, stress, and/or displacement values for each data point based on a principle of superposition applied to the at least three stress tensor models;
iteratively determining optimization parameters to fit the computed strain, stress, and/or displacement values to a far field stress value for each data point in the subsurface volume; and
applying the optimization parameters to the computed strain, stress, and/or displacement values to predict stress and displacement parameters in the subsurface volume in real-time.

6. The non-transitory computer-readable storage medium of claim 5, further comprising instructions for receiving a user-selected tectonic stress for the subsurface volume; and calculating the resulting stress and displacement parameters in the subsurface volume in real-time.

7. The non-transitory computer-readable storage medium of claim 5, wherein iteratively determining the optimization parameters further includes:
selecting a set of optimization parameters;
scaling the strain, stress, and displacement values by the optimization parameters;
assessing a cost of the scaled strain, stress, and displacement values;
wherein when the cost is not substantially minimized during an assessment iteration,
then selecting a next set of optimization parameters,
rescaling the strain, stress, and displacement values according to the next set of optimization parameters, and
reassessing the cost in a subsequent assessment iteration; and
wherein when the cost is substantially minimized,
then applying the scaled strain, stress, and displacement values to predict a stress result in the subsurface volume.

8. The non-transitory computer-readable storage medium of claim 5, further comprising instructions to predict a tectonic stress in real-time based on the computed strain, stress, and displacement values.

9. The non-transitory computer-readable storage medium of claim 5, wherein at least one data set is weighted and wherein at least one data set comprises one of fault geometry data, fracture orientation data, stylolites orientation data, secondary fault plane data, fault throw data, slickenline data, global positioning system (GPS) data, interferometric synthetic aperture radar (InSAR) data, laser ranging data, tilt-meter data, displacement data for a geologic fault, or stress magnitude data for the geologic fault.

10. The non-transitory computer-readable storage medium of claim 5, wherein the at least three linearly independent far field stress tensor models are each based on independent data sources, each data source obtained from one of seismic interpretation data, well bore data, or field observation data.

11. The non-transitory computer-readable storage medium of claim 5, wherein the predicted stress and displacement parameters comprise one of a stress inversion, a stress field, a far field stress value, a stress interpolation in a complex faulted reservoir, a perturbed stress field, a stress ratio and associated orientation, one or more tectonic events, a displacement discontinuity of a fault, a fault slip, an estimated displacement, a perturbed strain, a slip distribution on faults, a quality control on interpreted faults, fracture prediction, prediction of fracture propagation according to perturbed stress field, real-time computation of perturbed stress and displacement fields while performing interactive parameters estimation, or discernment of an induced fracture from a preexisting fracture.

12. A system comprising:
a processor;
memory; and
processor-executable instructions stored in the memory, the instructions executable to perform a process, including:
receiving values of a perturbed stress field associated with a fractured region of earth, the values calculated via at least three linearly independent numerical simulations;

receiving values of at least three far field stress vectors, the values used as boundary conditions for the numerical simulations;

based on the values of the at least three far field stress vectors, building and inverting a stress matrix that comprises columns representing the far field stress vectors to generate an inverted stress matrix;

based at least in part on the values of the perturbed stress field and the inverted stress matrix, minimizing a cost function to compute values of a parameter vector;

based at least in part on the values of the parameter vector, computing values of a paleostress vector associated with the fractured region of earth;

determining a tectonic regime based at least in part on the values of the paleostress vector; and associating the tectonic regime with at least one fault of the fractured region of earth.

* * * * *